(12) United States Patent
Allmendinger et al.

(10) Patent No.: US 9,861,905 B2
(45) Date of Patent: Jan. 9, 2018

(54) ON-BOARD AUDIO SYSTEM FOR A MODEL VEHICLE

(71) Applicant: TRAXXAS LP, McKinney, TX (US)

(72) Inventors: Otto Karl Allmendinger, Rowlett, TX (US); Scott Rollin Michael Schmitz, Lewisville, TX (US); Adam Cole Ewing, McKinney, TX (US); Thomas Michael Kawamura, Plano, TX (US); Richard Dale Rice, Jr., Wylie, TX (US)

(73) Assignee: TRAXXAS LP, McKinney, TX (US)

( * ) Notice: Subject to any disclaimer, the term of this patent is extended or adjusted under 35 U.S.C. 154(b) by 30 days.

(21) Appl. No.: 14/801,587

(22) Filed: Jul. 16, 2015

(65) Prior Publication Data

US 2016/0016091 A1    Jan. 21, 2016

Related U.S. Application Data

(60) Provisional application No. 62/025,451, filed on Jul. 16, 2014.

(51) Int. Cl.
*A63F 9/00* (2006.01)
*A63H 17/34* (2006.01)
(Continued)

(52) U.S. Cl.
CPC ............ *A63H 17/34* (2013.01); *A63H 30/02* (2013.01); *A63H 30/04* (2013.01); *F16B 11/006* (2013.01);
(Continued)

(58) Field of Classification Search
CPC ...................................................... A63H 17/34
See application file for complete search history.

(56) References Cited

U.S. PATENT DOCUMENTS 3,430,007 A    2/1969  Thielen
3,772,466 A   11/1973  Hossbach
(Continued)

FOREIGN PATENT DOCUMENTS

EP    1322136 A2    6/2003
EP    2023656 A1    2/2009
(Continued)

OTHER PUBLICATIONS

PCT/US2015/040794; International Search Report and Written Opinion; dated Dec. 21, 2015.
(Continued)

*Primary Examiner* — Seng H Lim
(74) *Attorney, Agent, or Firm* — Daryl R. Wright; Greg Carr

(57) ABSTRACT

A realistic simulation of the dynamic sounds of a full-sized vehicle are created on a moving R/C Scale Model. A mounting apparatus supports an audio exciter in a model vehicle without any modification to the exciter. A full range of volume of sound may be produced by the exciter without limiting the range of movement of the exciter as volume is increased or decreased. The apparatus may limit the mechanical excursion of the exciter to prevent physical damage to the exciter. The present invention also provides a method and apparatus for operating the audio exciter in a model vehicle.

22 Claims, 32 Drawing Sheets

(51) Int. Cl.
  *A63H 30/02* (2006.01)
  *F16B 11/00* (2006.01)
  *H04R 1/02* (2006.01)
  *A63H 30/04* (2006.01)
  *H04R 7/04* (2006.01)
  *H04R 9/06* (2006.01)

(52) U.S. Cl.
  CPC .............. *H04R 1/025* (2013.01); *H04R 7/04* (2013.01); *H04R 9/066* (2013.01); *H04R 2440/05* (2013.01); *H04R 2499/13* (2013.01)

(56) References Cited

U.S. PATENT DOCUMENTS

| | | | |
|---|---|---|---|
| 3,801,943 A | 4/1974 | Bertagni | |
| 4,256,930 A | 3/1981 | Garner et al. | |
| 4,258,499 A * | 3/1981 | Mabuchi | A63H 17/34 446/414 |
| 4,323,737 A | 4/1982 | Shimada et al. | |
| 4,359,133 A | 11/1982 | Krolak | |
| 4,384,174 A | 5/1983 | Suzuki et al. | |
| 4,465,905 A | 8/1984 | Nation | |
| 4,506,117 A | 3/1985 | Fresard | |
| 4,514,599 A | 4/1985 | Yanagishima et al. | |
| 4,665,550 A | 5/1987 | Haas | |
| 4,720,868 A | 1/1988 | Hirano | |
| 4,914,750 A | 4/1990 | Lawson | |
| 4,926,486 A | 5/1990 | Barsumian | |
| 4,946,416 A | 8/1990 | Stern et al. | |
| 5,088,955 A * | 2/1992 | Ishimoto | A63H 17/34 446/409 |
| 5,635,903 A * | 6/1997 | Koike | A63H 17/34 340/384.1 |
| 5,702,283 A * | 12/1997 | Watson, Jr. | A63H 5/00 434/373 |
| 5,734,726 A * | 3/1998 | Truchsess | A63H 17/34 381/61 |
| 5,835,605 A * | 11/1998 | Kunimoto | G10K 15/02 381/61 |
| 6,192,136 B1 | 2/2001 | Azima et al. | |
| 6,208,237 B1 | 3/2001 | Saiki et al. | |
| D451,909 S | 12/2001 | Mackie et al. | |
| 6,332,029 B1 | 12/2001 | Azima et al. | |
| 6,356,185 B1 * | 3/2002 | Plugge | G10H 1/00 340/384.3 |
| D455,733 S | 4/2002 | Stompler et al. | |
| D468,729 S | 1/2003 | Takayama et al. | |
| D472,232 S | 3/2003 | Stompler et al. | |
| 6,618,487 B1 | 9/2003 | Azima et al. | |
| D483,743 S | 12/2003 | Vosse | |
| D483,744 S | 12/2003 | Vosse | |
| 6,956,957 B1 | 10/2005 | Azima et al. | |
| D570,336 S | 6/2008 | Suzuki | |
| D582,399 S | 12/2008 | Venier et al. | |
| 8,247,930 B2 | 8/2012 | Yamagishi | |
| 9,327,203 B2 * | 5/2016 | Soheili | A63H 3/28 |
| 2003/0081800 A1 | 5/2003 | Klasco et al. | |
| 2010/0166210 A1 * | 7/2010 | Isozaki | B60L 3/00 381/86 |
| 2010/0189295 A1 | 7/2010 | Datz et al. | |
| 2011/0228967 A1 | 9/2011 | Kulchy et al. | |
| 2013/0230200 A1 | 9/2013 | Lau | |
| 2013/0288566 A1 | 10/2013 | Filoseta et al. | |
| 2015/0003639 A1 | 1/2015 | Cheung | |
| 2015/0049894 A1 | 2/2015 | DiTullo et al. | |
| 2015/0071475 A1 | 3/2015 | Hose et al. | |
| 2015/0256912 A1 | 9/2015 | Nedelman | |

FOREIGN PATENT DOCUMENTS

| | | |
|---|---|---|
| EP | 2482024 A2 | 8/2012 |
| JP | 2007-137179 A | 6/2007 |
| RU | 2098926 C1 | 12/1997 |
| WO | WO 88/08239 A1 | 10/1988 |
| WO | WO 98/31188 A1 | 7/1998 |

OTHER PUBLICATIONS

Dayton Audio; "Tech Note: Understanding Exciters—Principles and Applications;" Dayton Audio, Springboro, Ohio; daytonaudio.com; Apr. 21, 2014.

Azima et al., "Loudspeakers," U.S. Appl. No. 09/341,295, filed Jan. 5, 1998; Amendment filed Jun. 4, 2001.

* cited by examiner

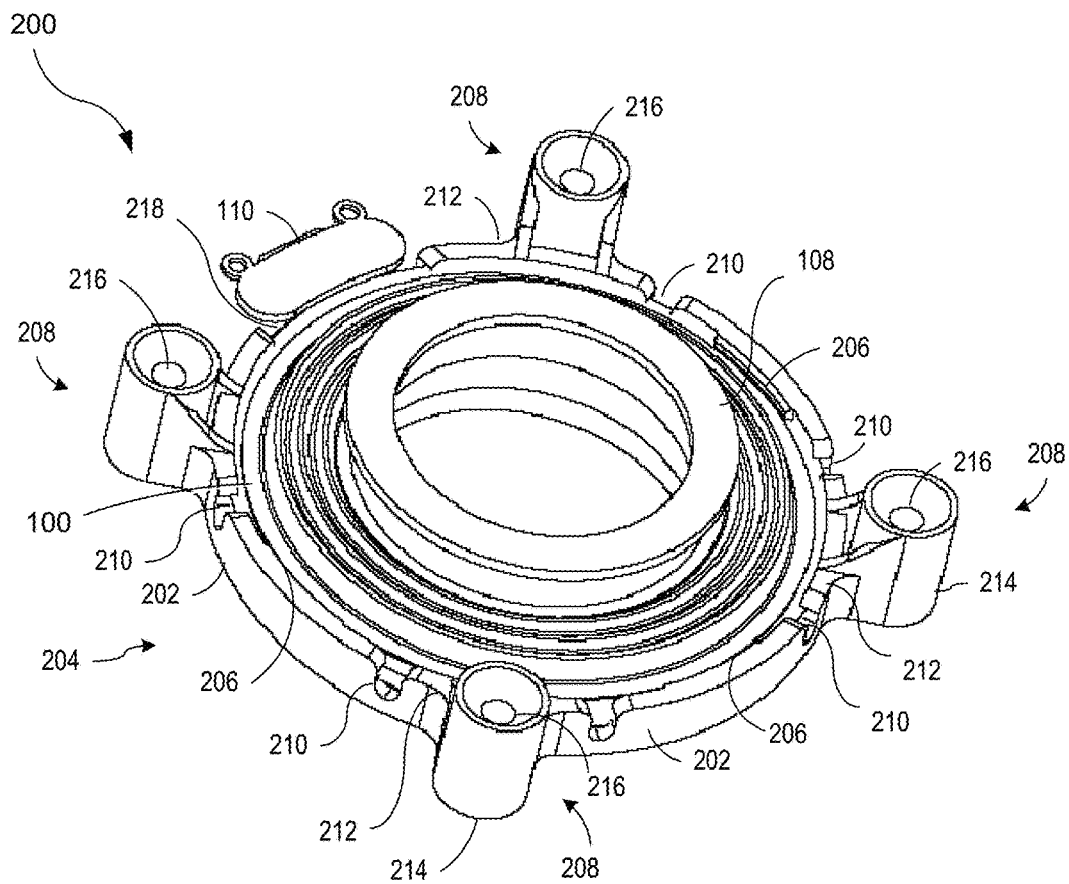
FIG. 2
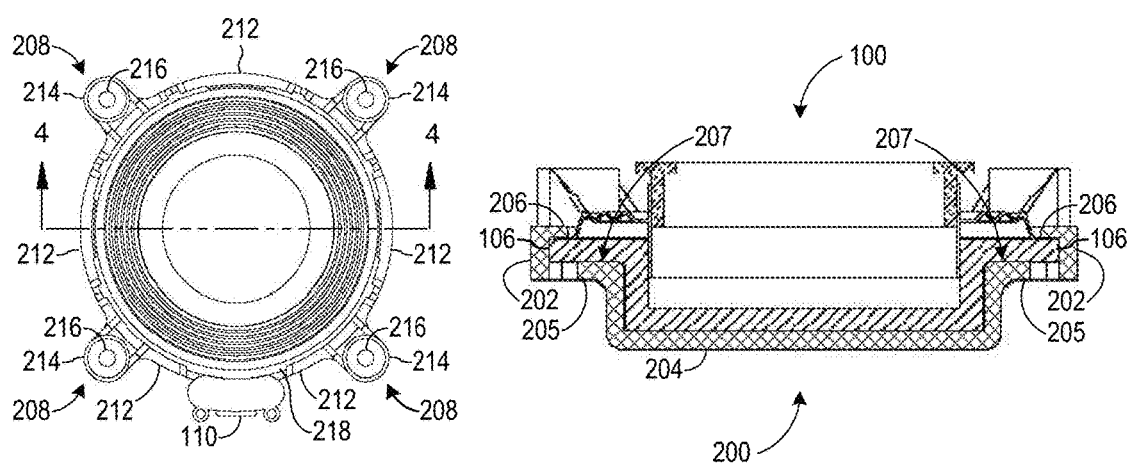
FIG. 3                    FIG. 4

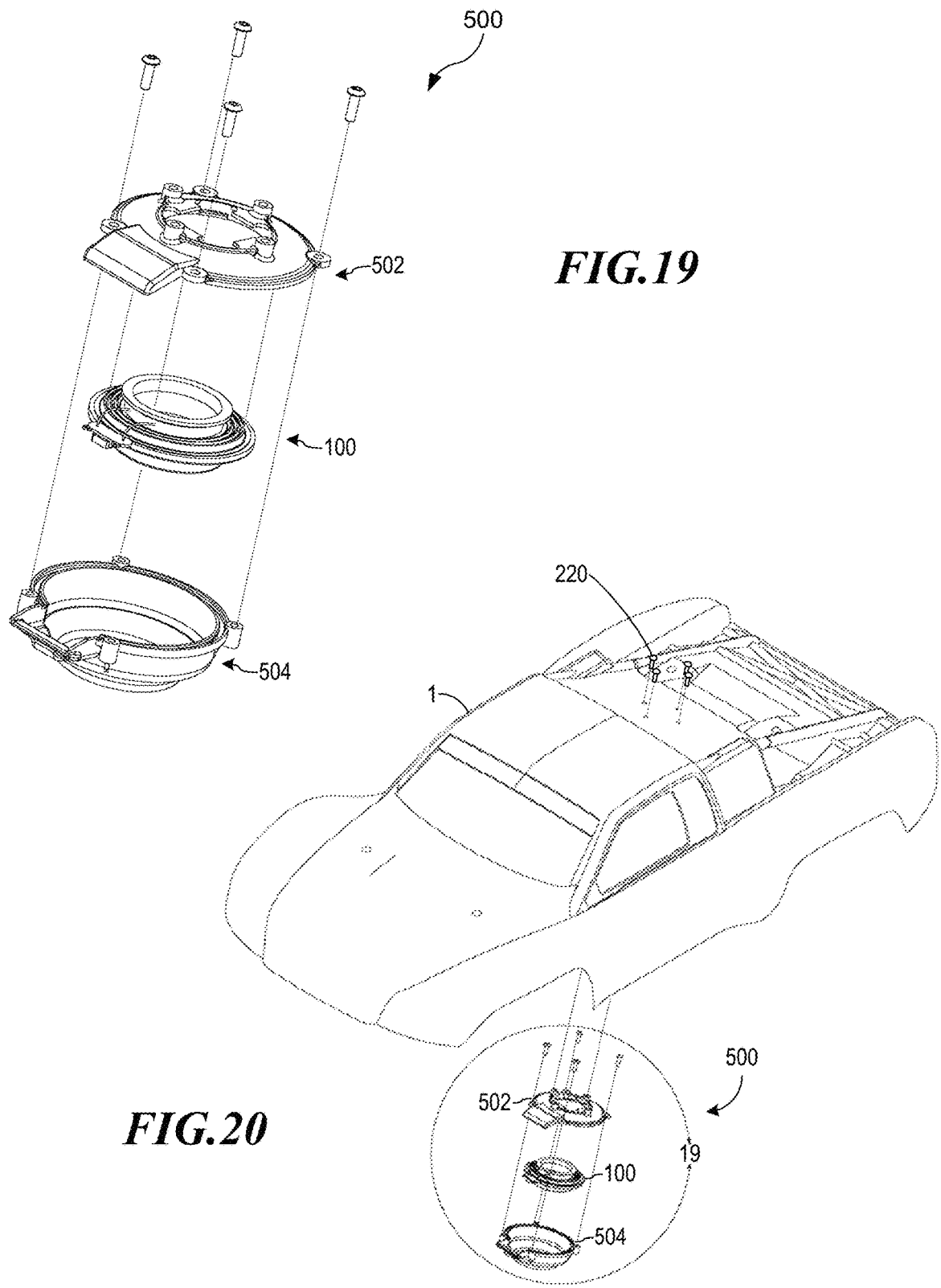

FIG. 24
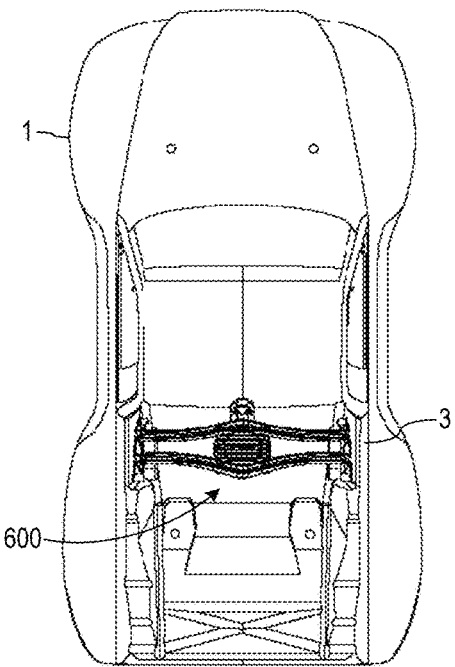
FIG. 25
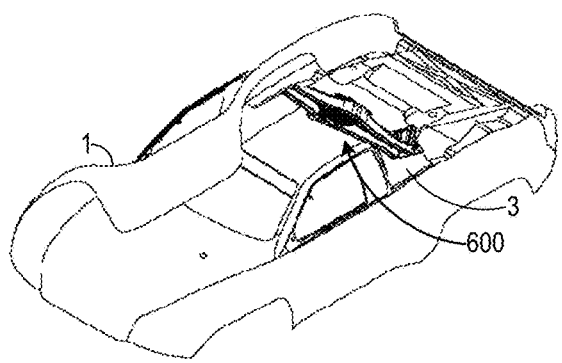
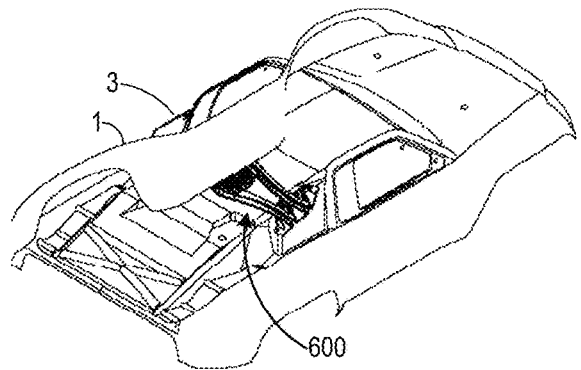
FIG. 26

FIG. 45
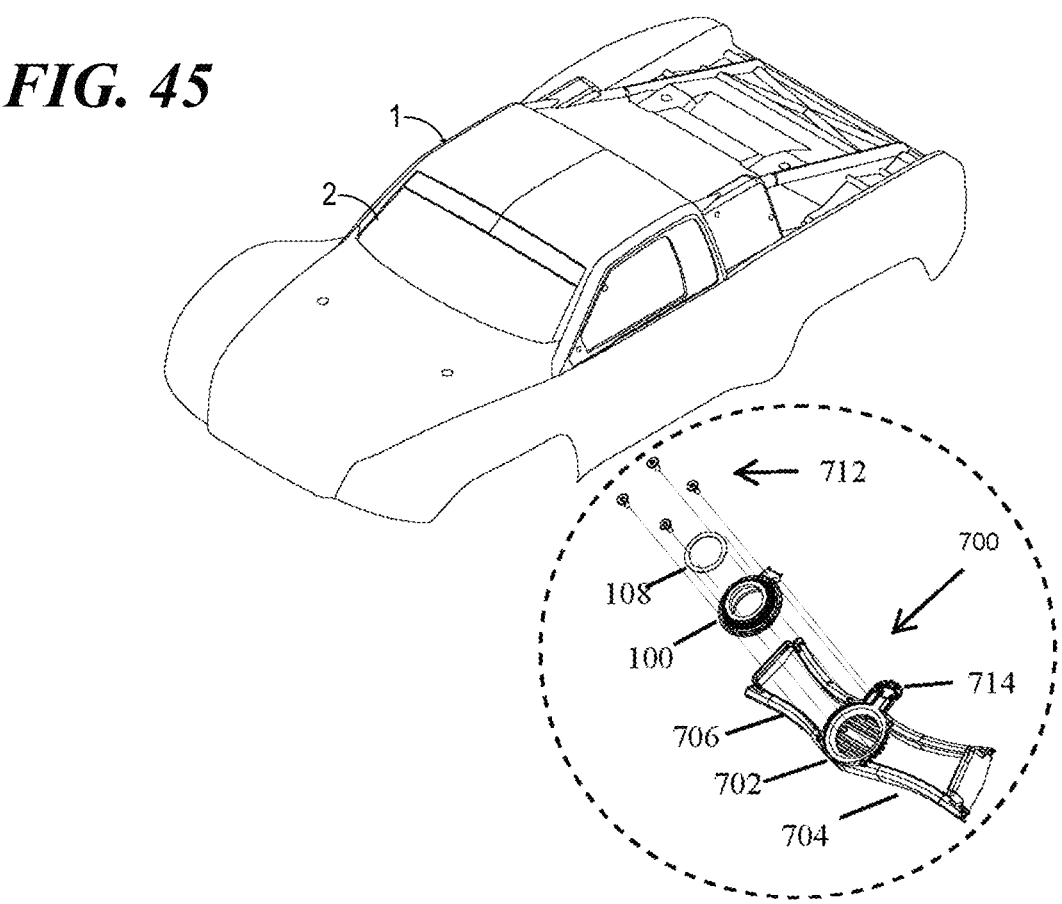
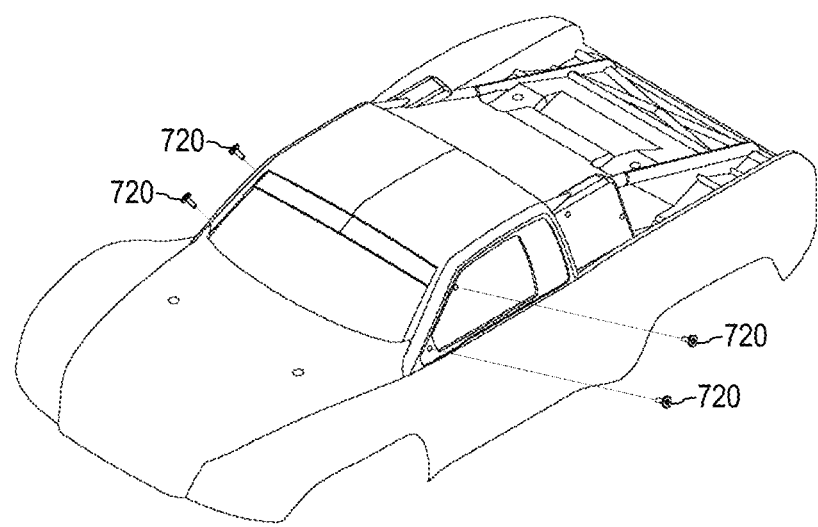
FIG. 46

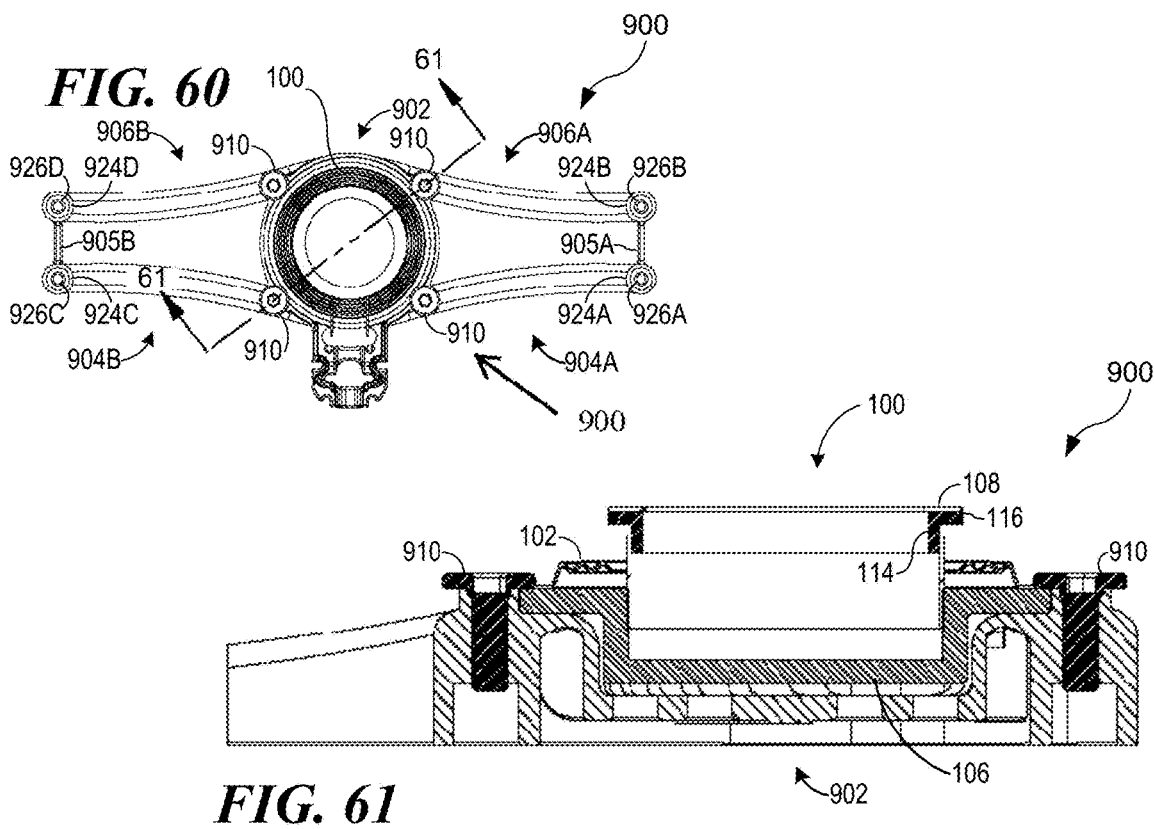
FIG. 60
FIG. 61
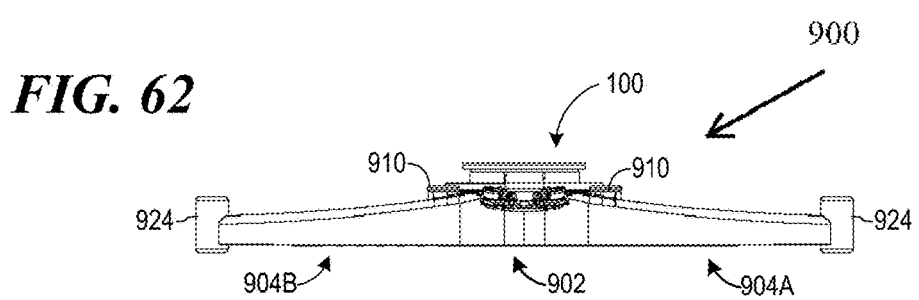
FIG. 62
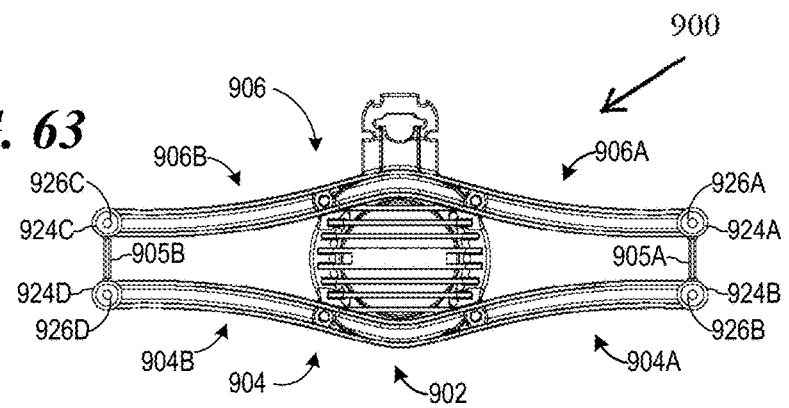
FIG. 63

ON-BOARD AUDIO SYSTEM FOR A MODEL VEHICLE

CROSS-REFERENCE TO RELATED APPLICATIONS

This application relates to, and claims the benefit of the filing date of, co-pending U.S. provisional patent application Ser. No. 62/025,451 entitled ON-BOARD AUDIO SYSTEM FOR A MODEL VEHICLE, filed Jul. 16, 2014, the entire contents of which are incorporated herein by reference for all purposes.

BACKGROUND OF THE INVENTION

Field of the Invention

The present invention relates to an audio system for a model vehicle and, more particularly, to an apparatus for mounting an audio exciter, and to a method and apparatus for operating the audio exciter.

Description of the Related Art

Remote Control (R/C) scale model vehicles mimic the design, style and handling of the full-sized vehicles on which they are based, but at a fraction of the size and cost. While these vehicles emulate the physical characteristics of the full-sized original, R/C model vehicles, particularly electric-powered models, do not recreate the audible experience of the full-sized originals.

Certain commercially available audio exciters, also known as audio transducers, are originally intended, as purchased, to mount to an object by means of an adhesive ring supported on a plastic mounting tab. The adhesive is originally intended to be strong enough to keep the exciter mounted to any surface that it is attached to. However, the operating conditions of an R/C model vehicle are generally too severe to rely only upon the adhesive to ensure the exciter stays mounted during the vehicle operation and movement. Most audio systems on the market today require an actual speaker to be mounted somewhere. The speakers are often times fragile and not weather-resistant. A stick-on audio exciter will be damaged very easily in crashes when relying only upon the stock exciter's adhesive ring for mounting.

SUMMARY

The present invention provides a realistic simulation of the dynamic sounds of a full-sized vehicle created on a moving R/C Scale Model. A mounting apparatus supports an audio exciter in a model vehicle without any modification to the exciter. In an embodiment, a full range of volume of sound may be produced by the exciter without limiting the range of movement of the exciter as volume is increased or decreased. The apparatus may limit the mechanical excursion of the exciter to prevent physical damage to the exciter during extreme operation. The present invention also provides a method and apparatus for operating the audio exciter in a model vehicle.

BRIEF DESCRIPTION OF THE DRAWINGS

For a more complete understanding of the present invention and the advantages thereof, reference is now made to the following Detailed Description taken in conjunction with the accompanying drawings, in which:

FIG. 2 illustrates a first mounting apparatus for an audio exciter;

FIG. 3 is a top view of a first mounting apparatus;

FIG. 4 is a sectional view of taken along the lines 4-4 in FIG. 3;

FIG. 19 is an exploded view of the fourth mounting apparatus;

FIG. 20 is an exploded view of the fourth mounting apparatus and a model vehicle;

FIG. 24 is a bottom view of a body for a model vehicle showing the fifth mounting apparatus for an audio exciter installed;

FIGS. 25-26 are perspective views of a model vehicle body showing the fifth mounting apparatus installed;

FIGS. 32, and 35-36 are perspective views of a mount showing use of a strain relief, wherein FIG. 36 is a detail of FIG. 35;

FIG. 45 is an exploded view of the sixth mounting apparatus and a model vehicle body;

FIG. 46 is a partially exploded view corresponding to FIG. 45;

FIG. 60 is a top view of the eighth mounting apparatus;

FIG. 61 is a sectional view of the eighth mounting apparatus taken along the lines 61-61 in FIG. 60;

FIG. 62 is a front view of the eighth mounting apparatus;

FIG. 63 is a bottom view of the eighth mounting apparatus;

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, specific details, and the like have been omitted inasmuch as such details are not considered necessary to obtain a complete understanding of the present invention, and are considered to be within the understanding of persons of ordinary skill in the relevant art.

Mechanical Installation

Figure 1A:
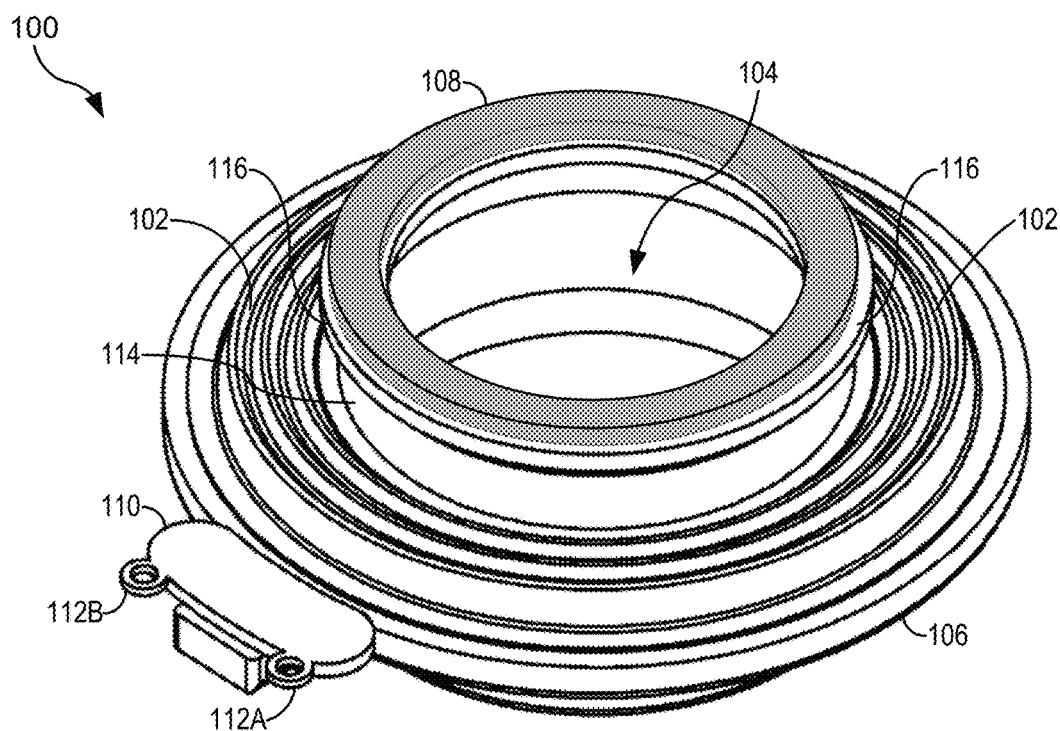
FIGS. 1A-D illustrate a typical audio exciter and a method for mounting.
Figure 1B:
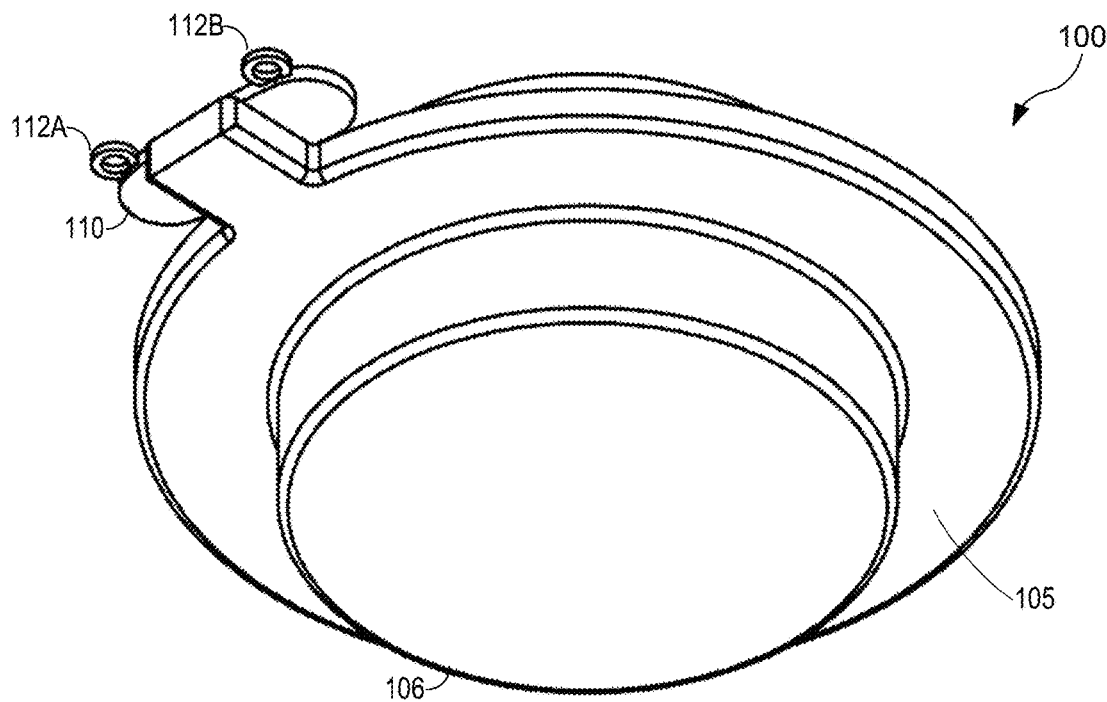
Figure 1C:
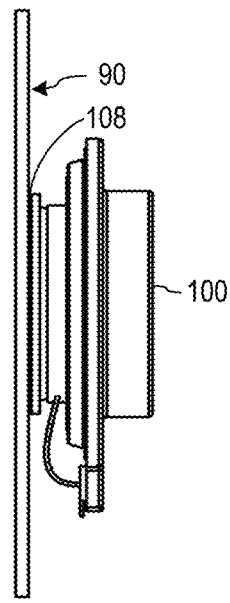
Figure 1D:
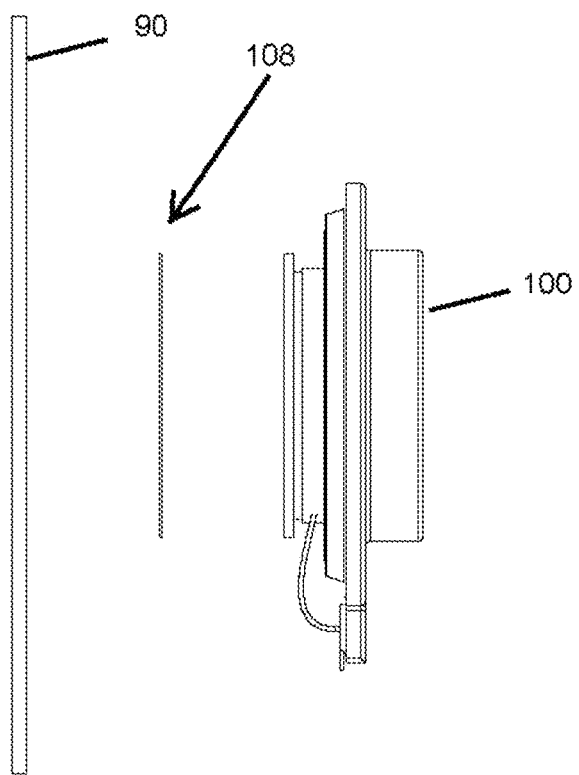

A typical audio exciter 100 is shown in FIGS. 1A-1D. In one embodiment the exciter comprises a semi-toroidal, flexible element 102 having an aperture 104, affixed to a housing 106 having a flange 105. The aperture 104 may be formed by a circular central ring body 114, having a broad upper portion 116, which may be affixed to a central portion of the flexible element 102. An adhesive mounting ring 108 surrounding the aperture 104 is supported on broad upper portion 116 of the central ring body 114, and provides for mounting the exciter 100 to a planar surface or other object. The adhesive mounting ring may be a circle of double-sided adhesive tape, such as 3M brand "VHB" tape, for example. An electrical connector plate 110 having two electrical terminals 112A, 112B for connecting electrical audio signals to the exciter 100 is supported at a position on the perimeter of the housing 106. As shown in FIG. 1C-1D, the audio exciter 100 may be affixed to a surface 90 via the adhesive mounting ring 108, and may rely upon the adhesive to keep the audio exciter 100 affixed to its mounting surface. The audio produced by this "simple flat" mounting configuration may be preferred and exemplary.

Figure 5:
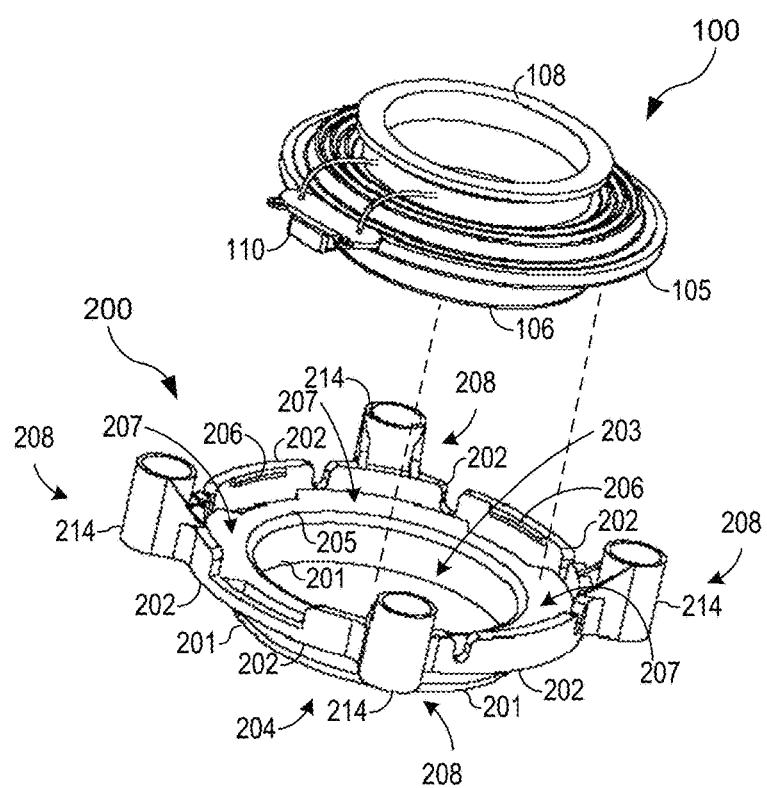
FIG. 5 is an exploded view of a first mounting apparatus.

Turning now to FIGS. 2-6, a first mounting apparatus 200 for an audio exciter 100 is shown in a perspective view with the audio exciter 100 installed in FIG. 2, and in an exploded view with the audio exciter 100 shown separately in FIG. 5. FIG. 3 is a top view, and FIG. 4 is a cross-sectional view that illustrates audio exciter 100 secured within circular mounting portion 204 by suitable retention members. The central ring body 114 is shown with broad upper portion 116 having adhesive mounting ring 108 affixed thereon. Flexible element 102 is may vibrate freely and respond to electrical signals applied to the audio exciter 100. The first mounting apparatus 200 may be a generally circular object having curved walls 201 (FIG. 5) molded or otherwise formed as a continuously circular body 204 having a cavity 203 within. The continuously circular body 204 may have flange 205 formed at a first end of the circular body portion 204. The flange 205 may be perpendicular to the curved walls 201 of the circular body portion 204 and may have an upward-facing surface 207 extending outwardly around a circumference of the flange 205 for receiving and supporting the audio exciter 100 by its flange 105. One or more curved walls 202 may extend upwardly from a perimeter of the flange 205. In an embodiment, the first mounting apparatus 200 may have retention members such as detents 206 formed in the tops of curved walls 202 for retaining the audio exciter 100 with minimal movement within the first mounting apparatus 200. As shown in FIGS. 4-5, the detents 206 are made of a plastic material, and may be configured as curvilinear ridges extending inwardly from an interior surface of curved walls 202, conforming to the curve of the curved wall 202, and extending only a sufficient distance to capture the audio exciter 100 within the curved walls 202 and in contact with the upwardly-facing surface 207. In an embodiment, other materials may be used such as metal or fibrous materials, and the like. The mounting apparatus 200 may also have curved corner sections 208 partially separated from the curved walls by gaps 210. Each corner section 208 may have a section of curved wall 212 molded or otherwise formed into the continuously circular body 204, and a cylindrical boss 214 formed on an exterior surface of the curved wall 212.

In an embodiment as shown in FIG. 3, there may be four corner sections 208, with the four bosses 214 providing rigid mounting points to a body of a model vehicle. Each of the bosses 214 may have a central channel 216 for receiving mounting hardware, such as a machine screw or bolt. The central channel 216 may be a smooth bore, or it may be threaded, depending upon the desired application for mounting to a model vehicle body. In one of the curved walls 212, a wide gap 218 may be provided to accommodate the electrical connector plate 110 extending outwardly away from the center of the audio exciter 100. FIG. 4 illustrates in a cross-sectional view the audio exciter 100 within first mounting apparatus 200. The exciter housing 106 may be disposed within the cavity formed within circular body 204 and may rest upon the upper surfaces 207 of flange 205. A circumferential edge of exciter housing 106 may be captured by suitable retention members, such as detent members 216 formed in the circular walls 202 which extend upwardly from the flange 205.

The first mounting apparatus 200 shown in FIGS. 2-6 is illustrative, only, and shall not be construed as a limitation on the present invention. In alternative embodiments, the mounting apparatus may have additional, less, or different parts than those shown in FIGS. 2-6. Additionally, in an embodiment, the mounting apparatus may have a different shape, such as ovoid, rectangular, and the like. The mounting apparatus may be configured to have additional or fewer mounting points along its perimeter or elsewhere on the apparatus for receiving any type of mechanical fastener.

Figure 6:
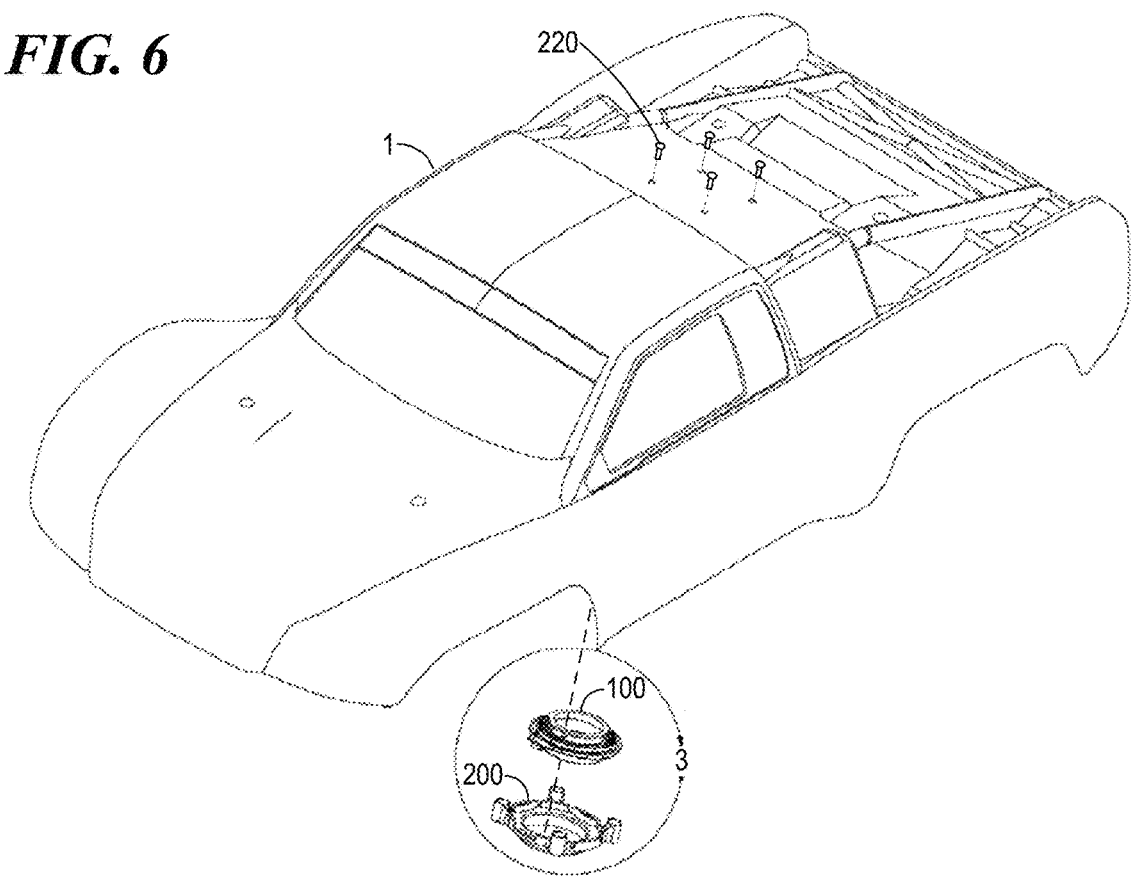
FIG. 6 is an exploded view of the first mounting apparatus and a model vehicle.

Turning now to FIG. 5, the housing 106 of the audio exciter 100 may be clipped into the first mounting apparatus 200, and the first mounting apparatus 200 may be secured to the body of a model vehicle using mechanical fasteners, such as screws. Adhesive ring 108 may also be used to help secure the audio exciter 100 to the model vehicle body. As shown in FIG. 6, the first mounting apparatus 200 may be mounted to the inside of a model vehicle body and secured using suitable fasteners, such as screws 220, for example. Using this configuration the audio exciter 100 is both securely mounted to the model vehicle body and protected from over travel since the body of the audio exciter 100 may not extend beyond the bottom of circular body 204 (see FIG. 4), but the sound generated may be altered significantly compared to the "simple flat" mounting configuration of FIG. 1C-1D, due to the acoustic effect of the relatively close and fixed mounting means of the first mounting apparatus 200, effectively limiting vibrations induced by the audio exciter 100. Said mounting means may alter such acoustic parameters as free-air resonance and frequency response; such effects are well-known in the field of loudspeaker and enclosure design.

Turning now to FIGS. 7-10 a second mounting apparatus 300 for an audio exciter 100 is shown in perspective views with the audio exciter 100 installed. The second mounting apparatus 300 may comprise a generally circular ring 302, having upper and lower planar surfaces 303A and 303B, respectively, and a nominal width. Mounting tabs 304 may extend inwardly from the circular ring 302 for making contact with the adhesive ring 108 of the audio exciter 100. Coincident with each of the mounting tabs 304 there may be a retention member such as a detent extending from the lower planar surface 303B of circular ring 302 and extending inwardly to contact a portion of the audio exciter 100 that supports the adhesive ring 108 thereof, as will be explained in more detail in connection with FIG. 11. In an embodiment, there may be four mounting bosses 306 extending upwardly from the upper surface 303A of ring 302, and provided with central channels 308 similar to central channels 216 as described hereinbefore, for attaching the second mounting apparatus 300 and the audio exciter 100 to the body of a model vehicle.

Figure 9:
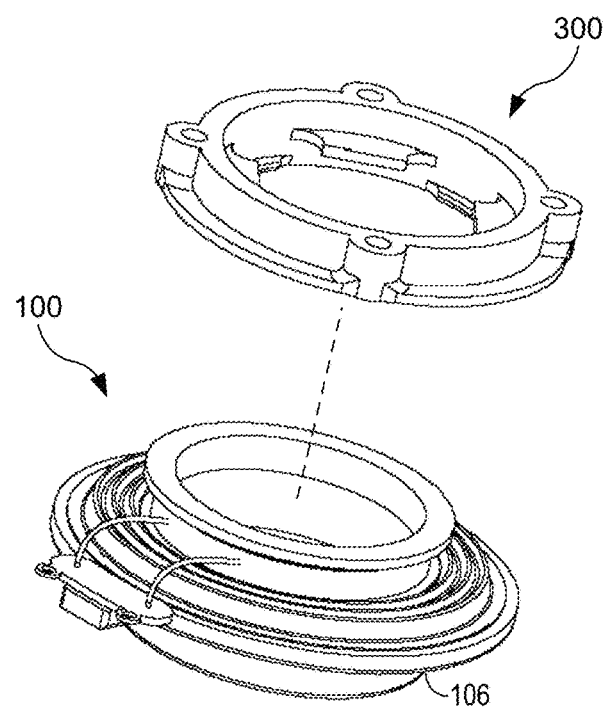
FIG. 9 is an exploded view of a second mounting apparatus.
Figure 10:
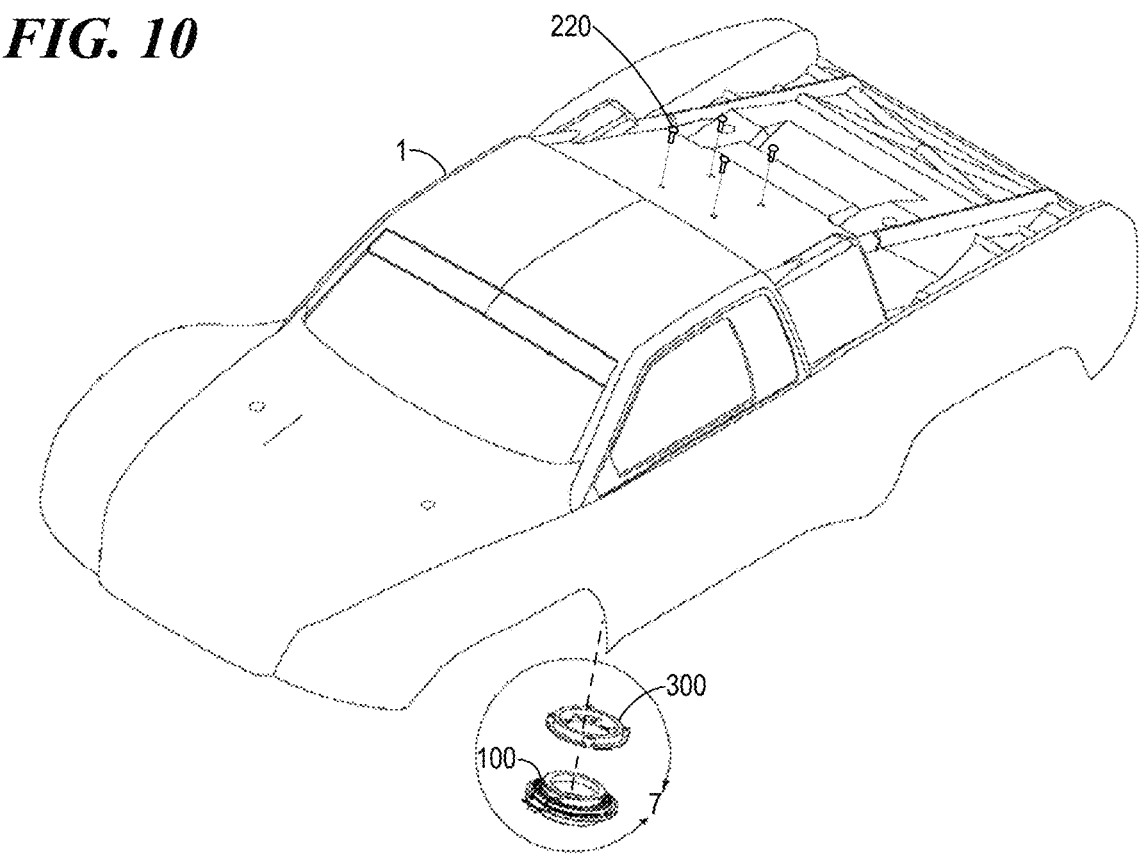
FIG. 10 is an exploded view of a second mounting apparatus and a model vehicle.

As shown in FIGS. 9-10, the housing 106 of the audio exciter 100 may be clipped into the second mounting apparatus 300, and the second mounting apparatus 300 may be secured to the body of a model vehicle 1 using suitable mechanical fasteners. Adhesive ring 108 may also be used to help secure the audio exciter 100 to the mounting apparatus 300. As shown in FIG. 10, the second mounting apparatus 300 may be mounted to the inside of a model vehicle body 1 and secured using suitable fasteners, such as screws 220, for example.

The mounting apparatus shown in FIGS. 9-10 is illustrative, only, and shall not be construed as a limitation on the present invention. In alternative embodiments, the mounting apparatus may have additional, less, or different parts that those shown in FIGS. 9-10. Additionally, in an embodiment, the mounting apparatus may have a different shape, such as ovoid, rectangular, and the like. The mounting apparatus may be configured to have additional or fewer mounting points along its perimeter or elsewhere on the apparatus for receiving any type of mechanical fastener, including nails, screws, brads, rivets, and the like and of different lengths and diameters than that shown.

Figure 7:
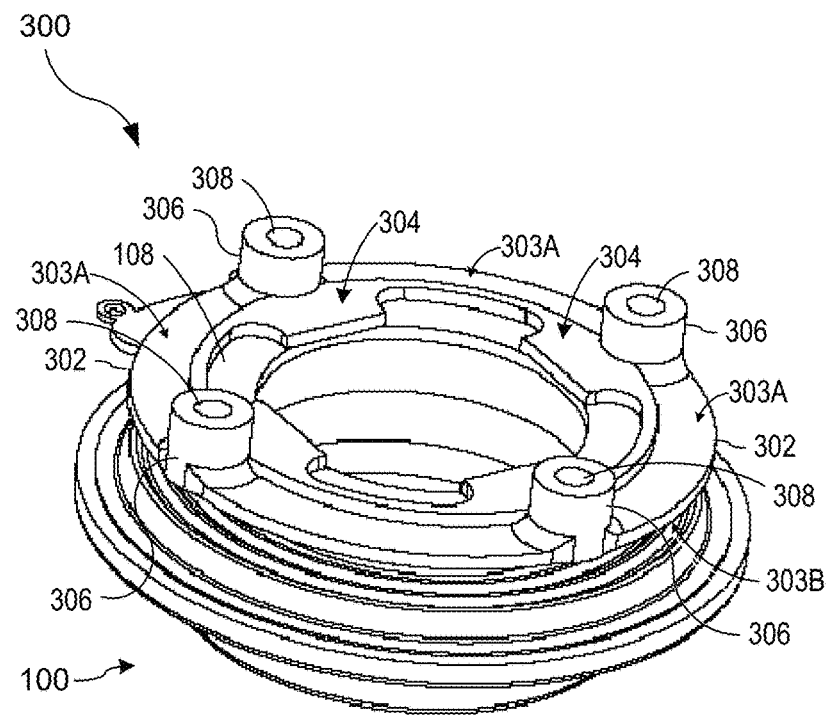
FIG. 7 is a perspective view illustrating a second mounting apparatus for an audio exciter.
Figure 8:
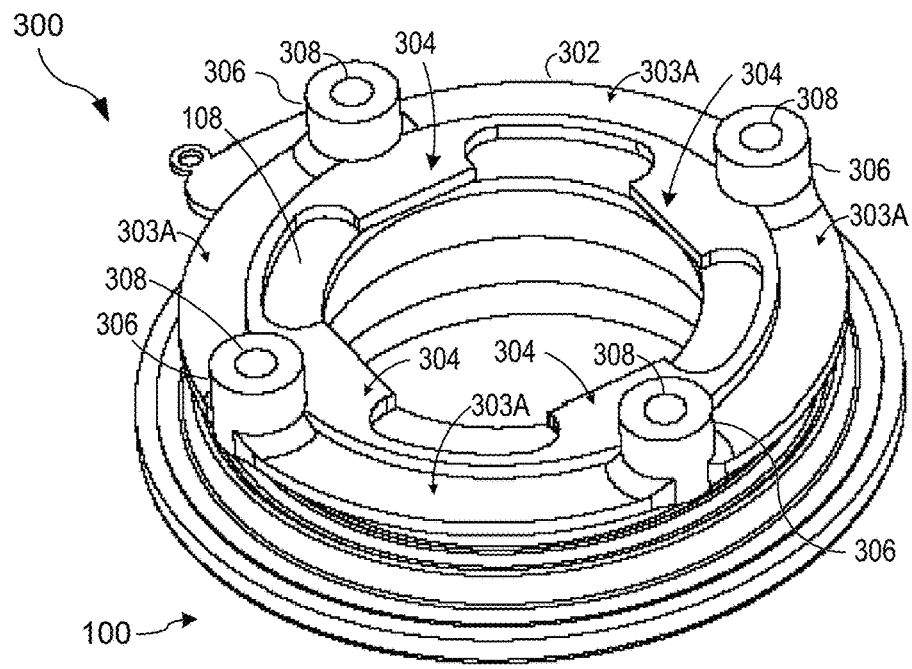
FIG. 8 is a perspective view illustrating details of the second mounting apparatus.
Figure 11:
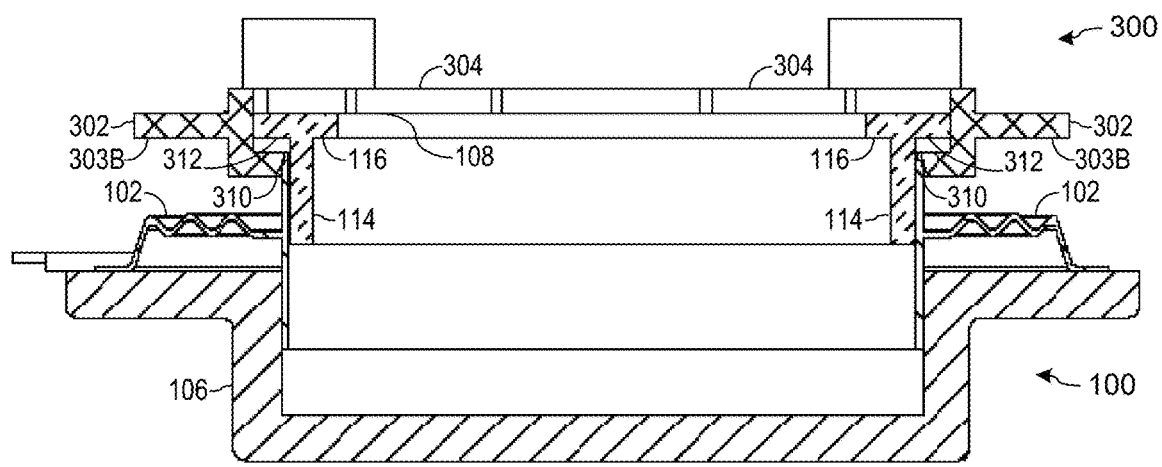
FIG. 11 is a sectional view illustrating details of the second mounting apparatus.

Turning now to FIG. 11, the second mounting apparatus 300 is shown in a cross-sectional view to illustrate certain mounting features of the second mounting apparatus 300. A retention feature such as detent 310 may extend downwardly from the lower planar surface 303B of ring 302 and extend inwardly to contact a central ring body 114 of the exciter 100 that supports the adhesive ring 108 thereof. As shown, the detents 310 are made of a plastic material. In an embodiment, other materials may be used such as metal or fibrous materials, and the like. The audio exciter 100 may be constructed having a central ring body 114 from which flexible element 102 depends. The central ring body 114 may have a T-shaped cross section with an upper portion 116, on top of which the adhesive ring 108 is supported. As shown in FIG. 7, the adhesive ring 108 may be compressed between the upper portion 116 of central ring body 114 and mounting tabs 304. The portion of detent 310 that extends inwardly extends at least far enough to capture the outer, lower edge 312 of upper portion 116 of central ring body 114. The audio exciter 100 may be coupled to the second mounting apparatus 300 by inserting the central ring body 114 into the second mounting apparatus 300 from below, such that the upper portion 116 is captured within ring 302, mounting tabs 304, and detents 310.

In the second mounting apparatus 300, the housing 106 of the exciter 100 may be allowed to "float", or hang from its mount in an unrestricted manner. The second mounting apparatus 300 may attach to the plastic central ring body 114 of the exciter with mounting tabs 304 and the original adhesive ring 108. The second mounting apparatus 300 may be attached to the body of a model vehicle with mechanical fasteners, such as 3 mm screws, for example, and may be much more robust than relying upon the adhesive ring 108 alone to secure the audio exciter 100 to a model vehicle body. The second mounting apparatus 300 may be very compact and may securely mount the audio exciter 100 to a model vehicle body, but may not protect the audio exciter 100 from over travel during a crash or other severe event. The sound produced by second mounting apparatus 300 is moderately altered compared to the "simple flat" mounting configuration of FIG. 1C. When supported by second mounting apparatus 300, the audio exciter 100 has to move more mass, which may lower the volume and may alter the frequencies produced.

Figure 12:
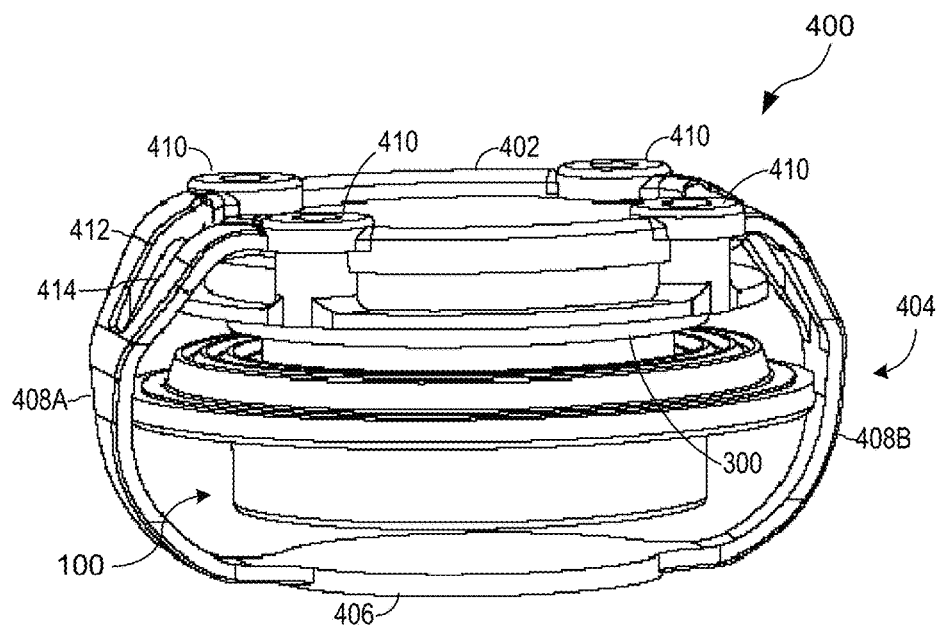
FIG. 12 illustrates a third mounting apparatus for an audio exciter.
Figure 13:
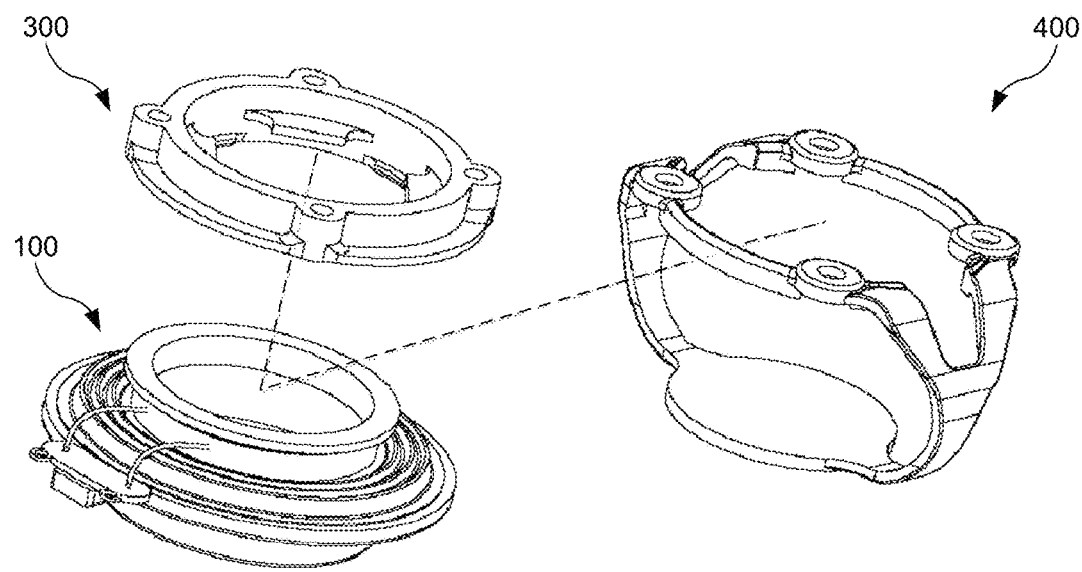
FIG. 13 is an exploded view of the third mounting apparatus.
Figure 14:
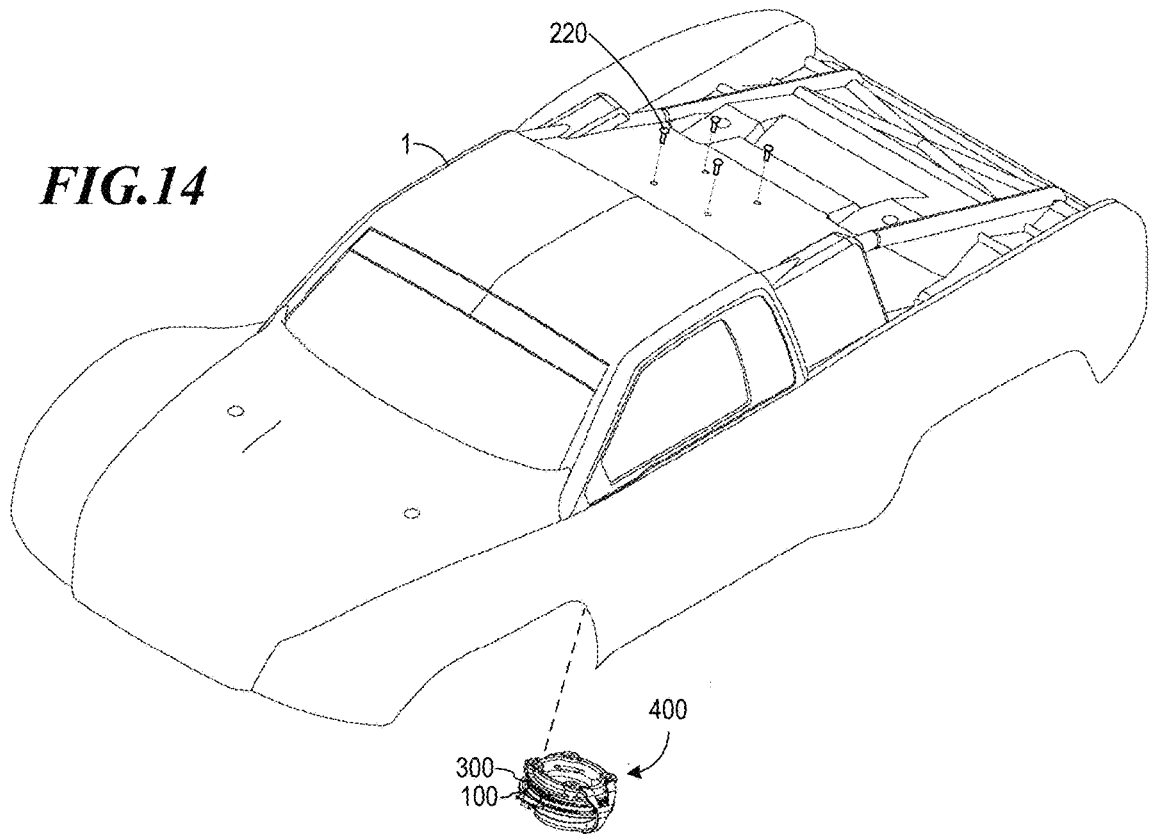
FIG. 14 is an exploded view of the third mounting apparatus and a model vehicle.

Turning now to FIGS. 12-14, a third mounting apparatus 400 for mounting an audio exciter 100 is shown in a perspective view in FIG. 12 illustrating an audio exciter 100 mounted to the third mounting apparatus 400, which may comprise a mounting ring 402 similar to second mounting apparatus 300 as described above, but with the addition of a support carriage 404. The support carriage 404 may have an excursion-limiting portion 406, such as the generally planar disk-shaped object shown in FIG. 12, positioned below the audio exciter 100. The excursion-limiting portion 406 maybe be supported by support arms 408A and 408B extending from the mounting ring 402. In an embodiment, each of the support arms 408 may join with the excursion-limiting portion 406 at one point, extend in a curvilinear fashion around the audio exciter 100, and join with two of support bosses 410 on the mounting ring 402. Note that support bosses 410 may be similar to the support bosses 306 described above. In an embodiment, each of the support arms may be a single continuous piece up to a point, and then may divide into first and second connecting portions 412, 414. Support arm 408A and support arm 408B may connect to and support the excursion-limiting portion 406 from two opposing points on the excursion-limiting portion 406, connect symmetrically to mounting ring 402, mounting bosses 410, and support the excursion-limiting portion 406 at an appropriate distance from the audio exciter 100, to prevent damaging the audio exciter 100 while mounted in a model vehicle body experiencing severe or violent operating conditions. The entire third mounting apparatus 400 may be molded as a single article, or may be assembled from separately molded pieces. In an embodiment, the second mounting apparatus 300 may be interposed between the audio exciter 100 and the third mounting apparatus 400, as shown in FIG. 13, and used to secure the audio exciter 100 to the third mounting apparatus 400 with suitable fasteners as described hereinbefore.

The support carriage 404 may prevent over travel of the flexible element 102 on the audio exciter 100. The carriage may overlap the existing mounting disc 402, as shown in FIG. 12, such that the support carriage 404 is sandwiched between the second mounting apparatus 300 and the model vehicle body 1 so they can use the same hardware 220 (FIG. 14) for mounting. This allows the number of hardware pieces to be minimized and reduces the overall weight of the installation, as shown in FIG. 13. The third mounting apparatus 400 may not fully seal the audio exciter 100 from harsh environments after it is installed. The sound produced by the third mounting apparatus 400 is moderately altered compared to the "simple flat" mounting configuration of FIG. 1C. The audio exciter 100 has to move more mass, which may lower the volume and may alter the frequencies produced.

Figure 15:
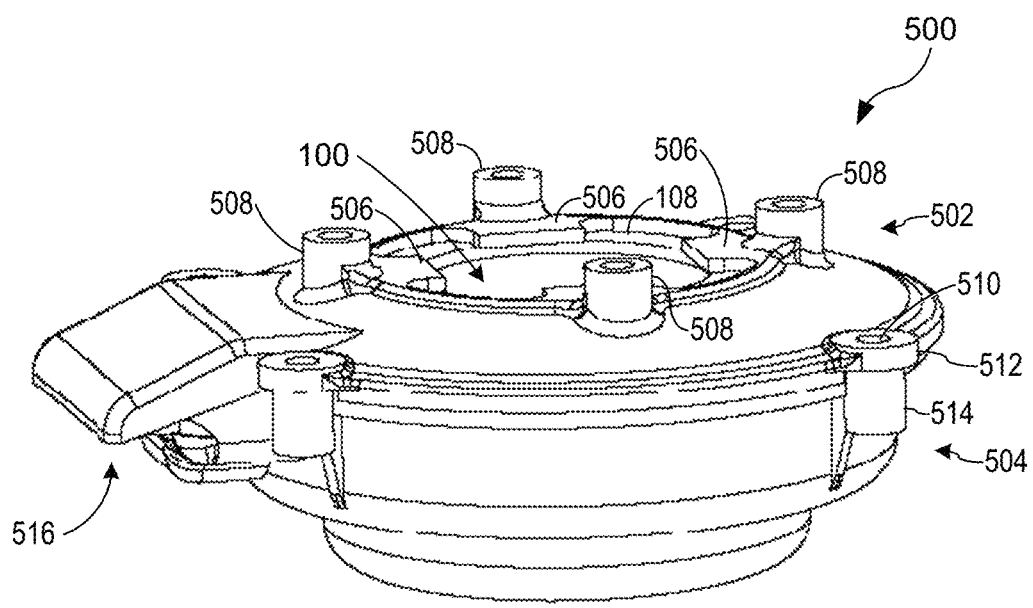
FIG. 15 is a perspective view illustrating a fourth mounting apparatus for an audio exciter.
Figure 16:
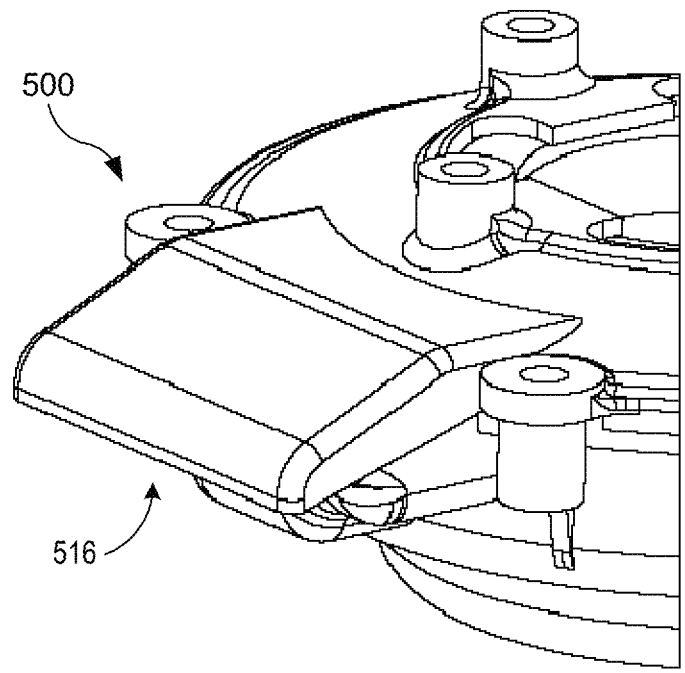
FIG. 16 is a detail perspective view of a portion of the fourth mounting apparatus illustrating further details thereof.

Turning now to FIGS. 15-20, a fourth mounting apparatus 500 for an audio exciter 100 is illustrated in a perspective views, and in sectional views, having an audio exciter 100 installed therein. The fourth mounting apparatus 500 protects the audio exciter 100 from harsh environments. As shown in FIG. 15 and FIG. 19, the fourth mounting apparatus 500 may have a top half 502 and a bottom half 504. The top half 502 may be configured to retain the audio exciter 100 by any means similar to those disclosed above with respect to FIGS. 2-12, the first mounting apparatus 200, or the second mounting apparatus 300. The top half 502 may have one or more mounting tabs 506, similar to the mounting tabs 304 described above with respect to second mounting apparatus 300, to which the adhesive 108 of the audio exciter 100 may be attached. The top half 502 may also include other mounting features for securing the audio exciter 100, as described above. The top half 502 may be mounted to a model vehicle body via mounting bosses 508, which may be similar to mounting bosses 214 or mounting bosses 306 as described with respect to first mounting apparatus 200 or second mounting apparatus 300, respectively. The bottom half 504 of the enclosed fourth mounting apparatus 500 may be a cup-shaped or bowl-shaped object that may be fastened and secured to the upper half by means of suitable mechanical hardware, such as, for example, 2.5 mm screws passing through mounting holes 510 formed mounting bosses 512 of the top half 502, which mate with corresponding mounting bosses 514 of the bottom half 504. When securely coupled, the top half 502 and the bottom half 504 form a water resistant enclosure, having a wiring access port 516, as shown in FIG. 16, where there is provided an exit for wiring used to make electrical connections to the audio exciter 100.

Figure 17:
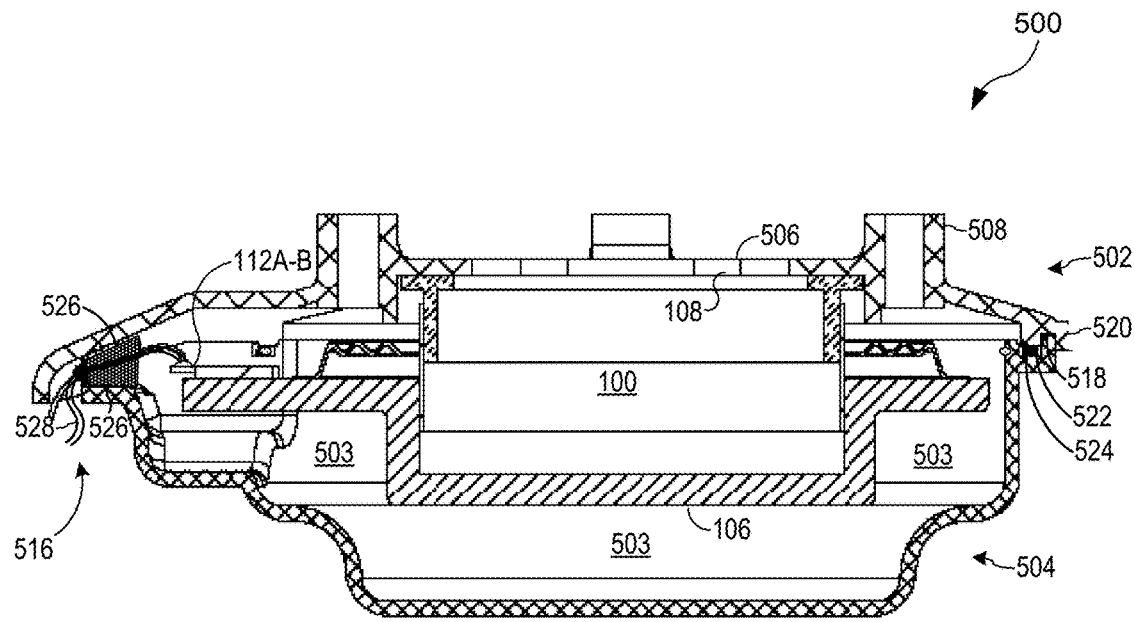
FIG. 17 is a sectional view illustrating details of the fourth mounting apparatus.

As shown in FIG. 17, a cross-sectional view of the fourth mounting apparatus 500 shows audio exciter 100 suspended within a cavity 503 formed by top half 502 and bottom half 504. The cavity 503 may provide clearance for movement of the audio exciter 100 but may also prevent over-travel of the audio exciter 100. Along a perimeter of the top half 502 there may be a groove 518 which mates with a corresponding lip 520 of the bottom half 504. Along a perimeter of the bottom half 504, there may be a groove 522 in which a sealing member 524, such as an O-ring or foam seal, may be used between the top half 502 and the bottom half 504 to prevent outside contaminants entering into the cavity 503 in which the audio exciter 100 is suspended. At wiring access port 516, one or more foam pads 526 may be used to seal the access port 516 while simultaneously permitting electrical wiring 528 to pass from within the enclosure. The electrical wiring 528 may be connected to terminals 112A, 112B of audio exciter 100 and, after exiting the enclosed fourth mounting apparatus 500 via wiring access port 516, may be connected to a source of audio signals to be reproduced. As shown in FIG. 20, the fourth mounting apparatus 500 maybe installed in the underside of a model vehicle body and secured using suitable fasteners, such as screws 220, for example.

Figure 18:
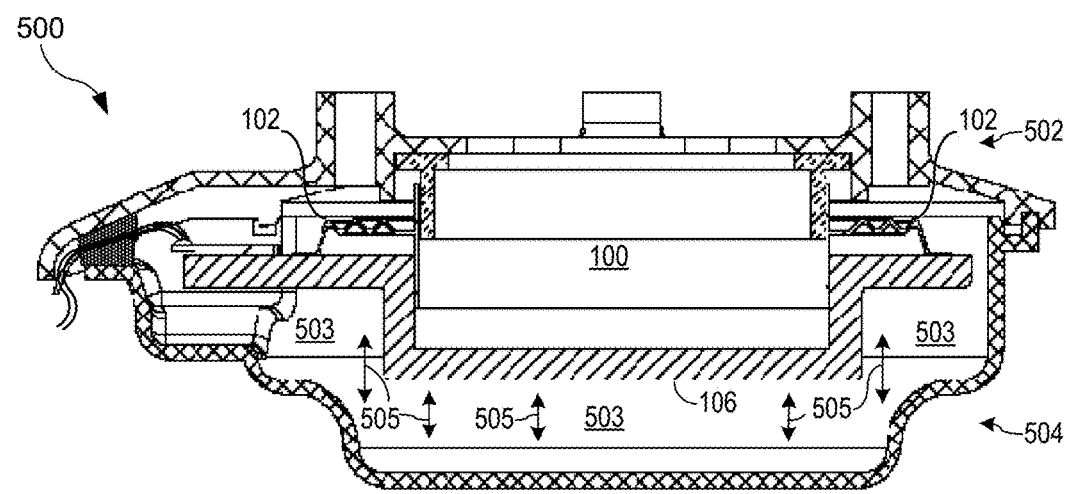
FIG. 18 is a sectional view illustrating operation of the fourth mounting apparatus.

As shown in FIG. 18, the bottom half 504 of the fourth mounting apparatus 500, while enclosing a lower portion, or housing 106, of the audio exciter 100, still allows for normal exciter movement within cavity 503, as illustrated by arrows 505, and may prevent the audio exciter 100 from over traveling on hard impacts, thereby protecting the audio exciter 100 from damage to the flexible element 102 during hard impacts which may be experienced by the model vehicle body in which the fourth mounting apparatus 500 is installed. Note that different types of exciters may be installed in an enclosure such as enclosed fourth mounting apparatus 500, even if the different types of exciters are not compatible with harsh environments, such as dust, sand, water, and the like. The sealing of the audio exciter 100 protects the audio exciter 100 while the model vehicle is operating, but the added mass may significantly alter the sound produced by the audio exciter 100. The mid-high frequencies may be affected such that the sound produced is more "muddled", not as clear. The lower frequency "bass" sound may be reduced, as well as the overall sound volume.

Figure 21:
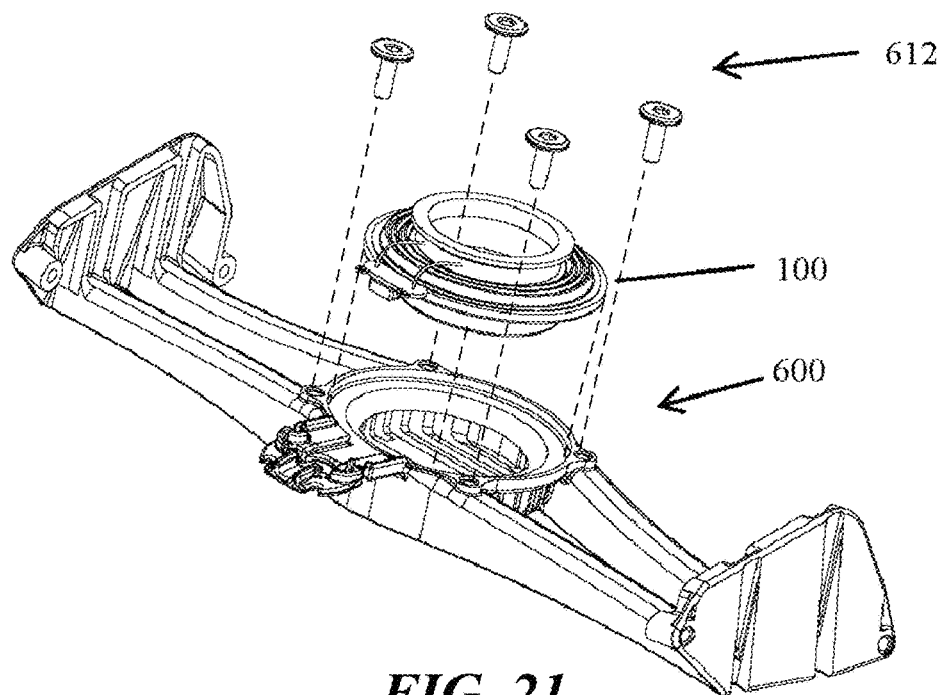
FIG. 21 is an exploded view of a fifth mounting apparatus for an audio exciter.
Figure 22:
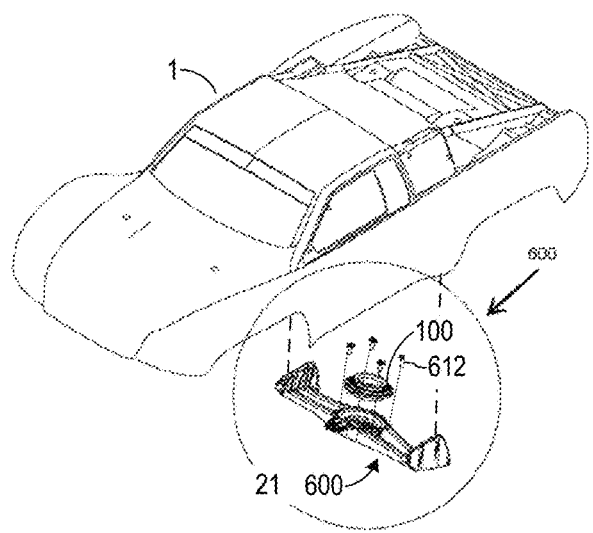
FIGS. 22-23 are perspective views showing are perspective views of the body for a model vehicle showing the fifth mounting apparatus for an audio exciter installed.
Figure 23:
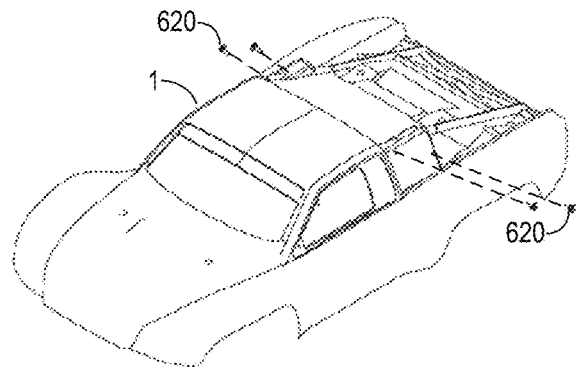

Turning now to FIGS. 21-23, the fifth mounting apparatus 600 is illustrated in some detail. FIG. 21 is an exploded view of the fifth mounting apparatus 600 showing the audio exciter 100 secured to the fifth mounting apparatus 600 by retention members 612 which may be any suitable fastener, such as machine screws as shown, for example. As shown in FIG. 22 and FIG. 23, the fifth mounting apparatus 600 may be installed in the underside of a model vehicle body and secured using suitable fasteners, such as screws 620, for example.

Turning now to FIGS. 24-26, a bottom view of a model vehicle body 1 showing the fifth mounting apparatus 600 installed in a rear position 3 of model vehicle body 1, such as in a rear window or rear portion of a vehicle cabin is shown in FIG. 24. FIG. 25 and FIG. 26 are perspective views of a model vehicle body 1 showing the fifth mounting apparatus 600 installed in a rear position 3 of model vehicle body 1.

Figure 27:
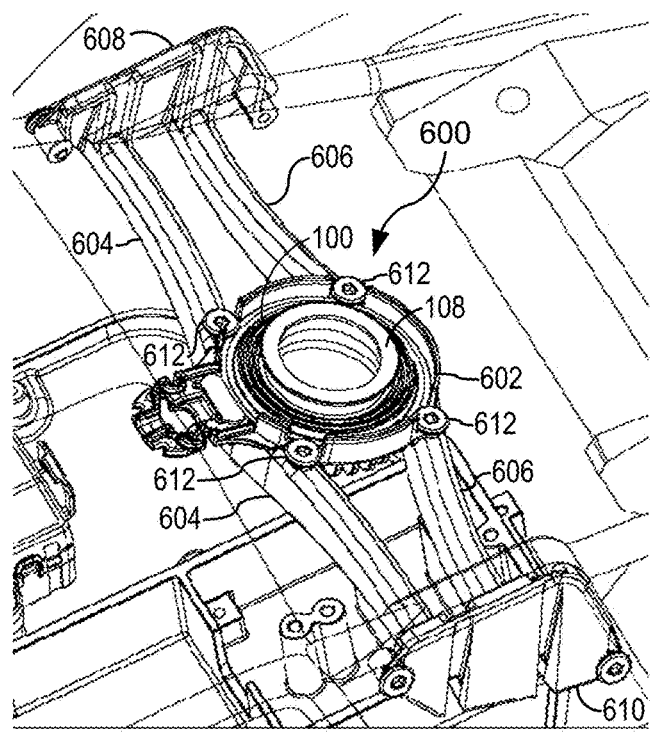
FIG. 27 illustrates a fifth mounting apparatus for an audio exciter, shown as mounted in a phantom model vehicle body.
Figure 28:
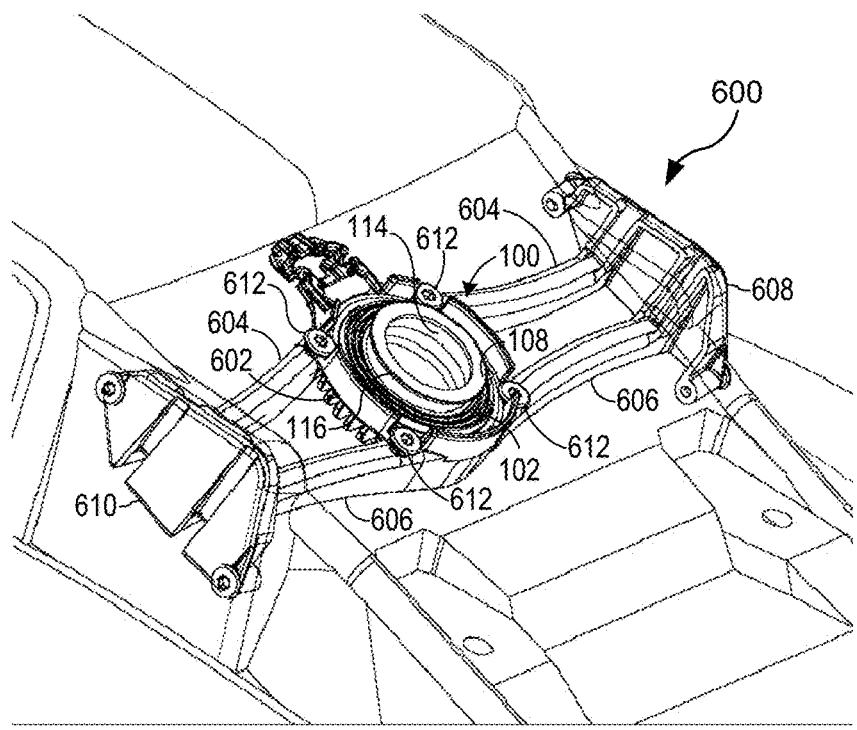
FIG. 28 illustrates another view of a fifth mounting apparatus for an audio exciter, shown as mounted in a phantom model vehicle body.

Turning now to FIGS. 27-28, a fifth mounting apparatus 600 for an audio exciter 100, is shown in multiple perspective representations supporting audio exciter 100, wherein the model vehicle body is shown in phantom for clarity. The fifth mounting apparatus 600 may be configured to extend the interior width of a model vehicle body, from side-to-side, for example, and support the audio exciter 100 from its back side, or housing 106 (FIG. 1A) at a suitable distance from the body of the model vehicle such that the adhesive ring 108 of the audio exciter 100 may be affixed to a panel of the model vehicle body. The fifth mounting apparatus 600 may have a mounting portion 602 for supporting the audio exciter 100. The mounting portion 602 may be supported by at least one transverse supporting arm 604 extending the interior width of a model vehicle model. In the embodiment shown in FIG. 27, two transverse supporting arms 604 and 606 extend from the mounting portion 602, and terminate in mounting plates 608 and 610. The audio exciter 100 may be secured into the mounting portion 602 by retention members, such as screws 612, for example, installed around the perimeter of the audio exciter, or retained by retention members such as detents as described above with respect to FIGS. 2-5, for example. As shown in FIG. 28, the mounting plates 608 and 610 may be secured to the interior portion of a model vehicle body by any suitable mechanical means, and the adhesive ring 108 on the central ring body 114 of audio exciter 100 may affix to an interior panel of a model vehicle body (not shown).

The fifth mounting apparatus 600 may allow the audio exciter 100 to move its voice coil at full-throw, but not allow the flexible element 102 to be damaged during impacts or extreme operating conditions. Because of the relatively long transverse supporting arms 604 and 606, the exciter has a larger area and wider portion of the body to excite. As a result, the sound produced by audio exciter 100 and fifth mounting apparatus 600 may not be significantly different from the sound produced by mounting audio exciter 100 to the body by adhesive ring 108 alone, such as the "simple flat" configuration of FIG. 1C.

The audio exciter 100 may not be fully sealed in the fifth mounting apparatus 600, and may be partially exposed to the environment. The internal portions of the audio exciter 100 are sealed against the entry of contaminants. Using the adhesive ring 108 on the plastic mounting tab 116 to attach to the body effectively seals the internal portions of the audio exciter 100 against the entry of contaminants.

Figure 29:
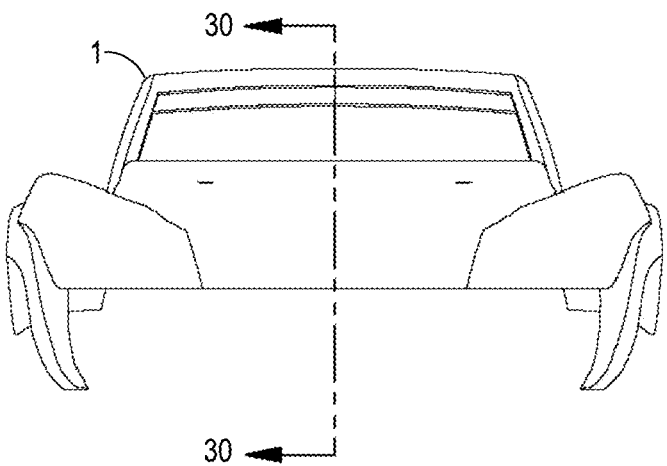
FIG. 29 is a front view of the body for a model vehicle.
Figure 30:
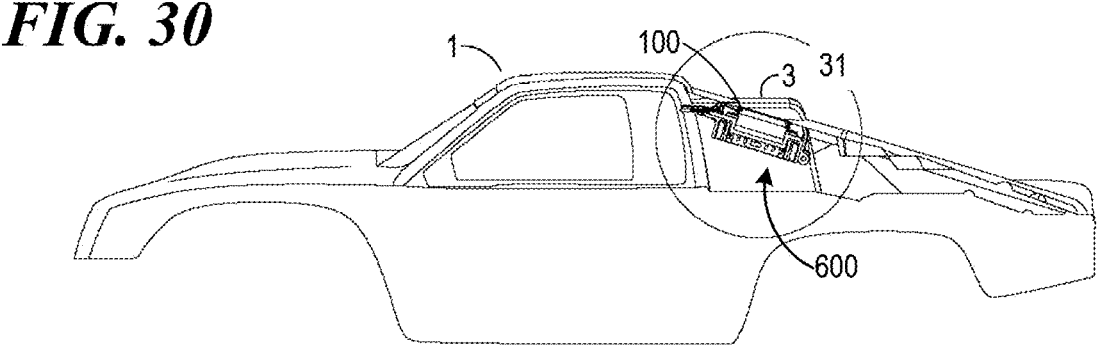
FIG. 30 is a cross-section of the body for a model vehicle taken along the lines 30-30 in FIG. 29.
Figure 31:
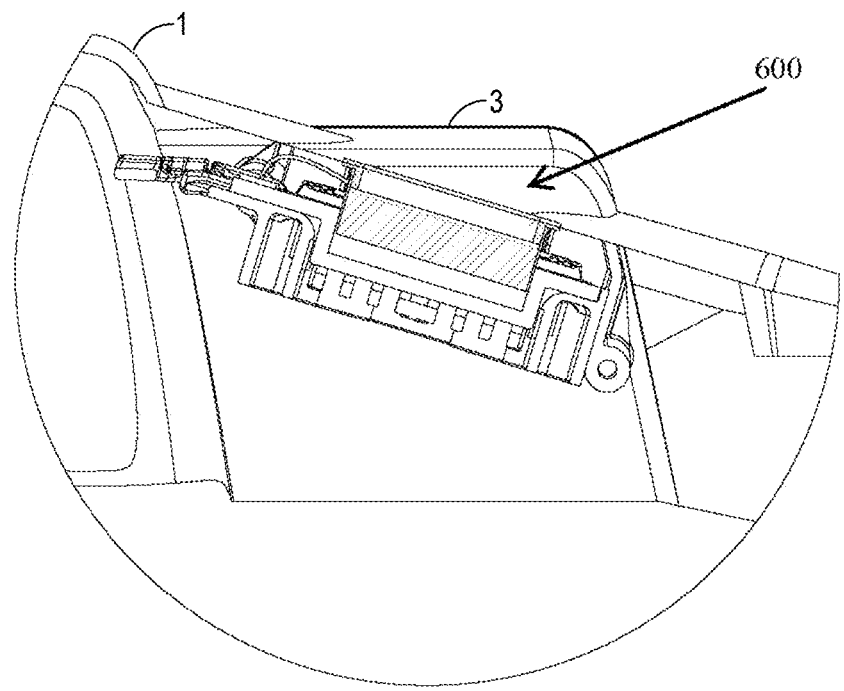
FIG. 31 is a cross-sectional detail of FIG. 30

Turning now to FIGS. 29-31, the fifth mounting apparatus 600 is illustrated in more detail. FIG. 29 is a front view of a typical model vehicle body 1. FIG. 30 is a cross-sectional view of the typical model vehicle body 1 showing the fifth mounting apparatus 600 installed in a rear position 3, mounted under the rear portion of the typical model vehicle body 1. FIG. 31 is a detail of the cross-section shown in FIG. 30.

Figure 32:
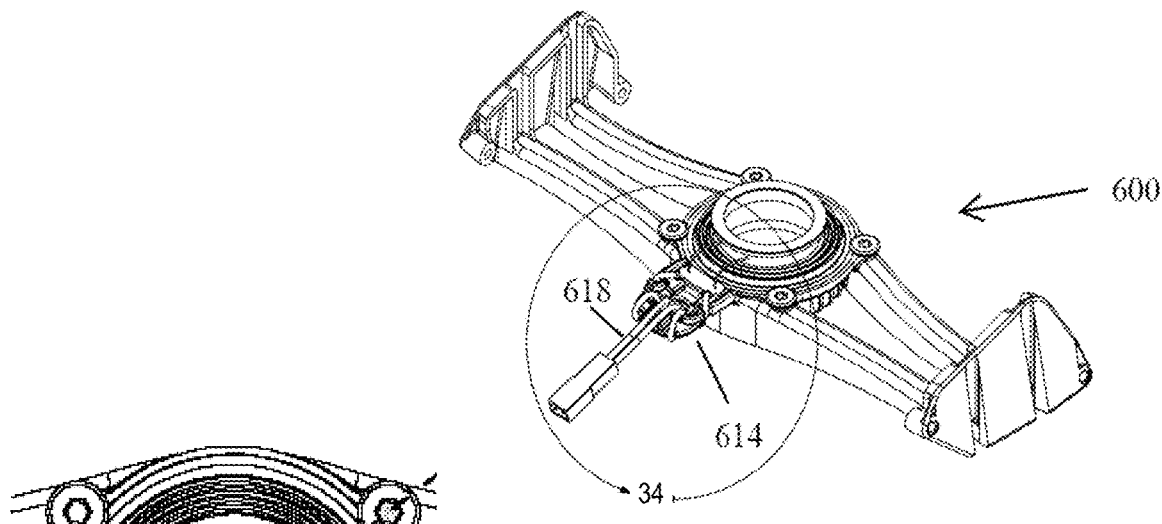
Figure 33:
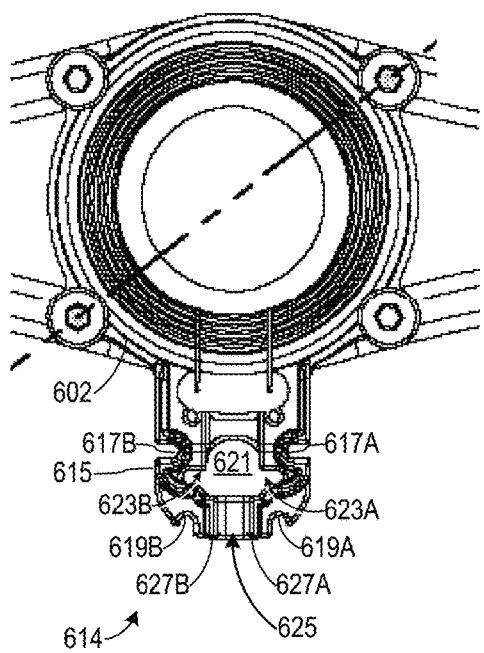
FIG. 33 is a top view of a strain relief member.
Figure 34:
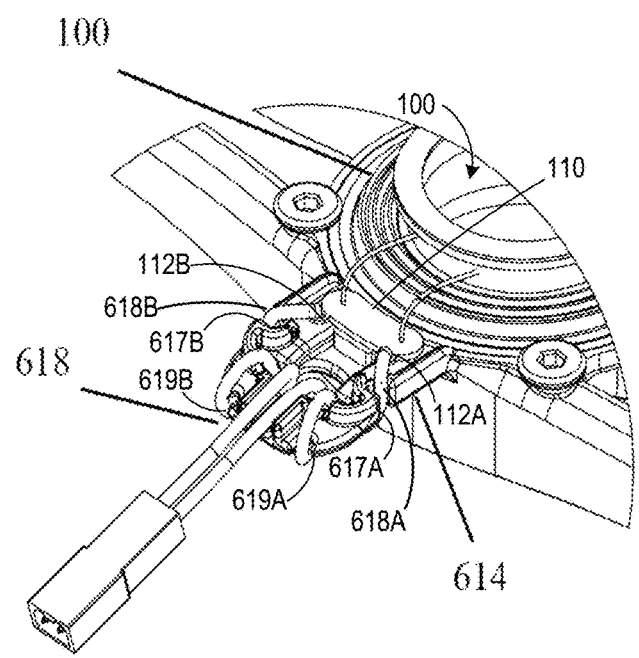
FIG. 34 is a detail of FIG. 32.

Turning now to FIGS. 32-34, a strain relief member 614 may be a loop-like structure 615 provided in a mount, such as fifth mounting apparatus 600, for wrapping the wiring 618 through the member 614 to form a strain relief. FIG. 32 shows an exemplary mounting apparatus, such as fifth mounting apparatus 600, in perspective illustrating the area in which the strain relief member 614 may be located at the center front of the fifth mounting apparatus 600. FIG. 33 illustrates a top view of the strain relief member 614, which is formed by a structure 615 extending from mounting portion 602. The structure 615 may have a main aperture 621 provided for the passage of electric wires therethrough. The main aperture 621 may have first and second additional side spaces or auxiliary apertures 623A, 623B contiguous with main aperture 621. First and second rearward notches 617A, 617B may be provided in structure 615 at some distance between a proximal end of structure 615 adjoining the circular mounting portion 602 and a distal end of structure 615. First and second forward notches 619A, 619B may be provided in structure 615 in the distal end of structure 615. A channel 625 may be formed between first and second wire guides 627A, 627B, which may be short walls formed in the distal end of structure 615, spaced apart a suitable distance for the passage of electrical wires therebetween.

Figure 35:
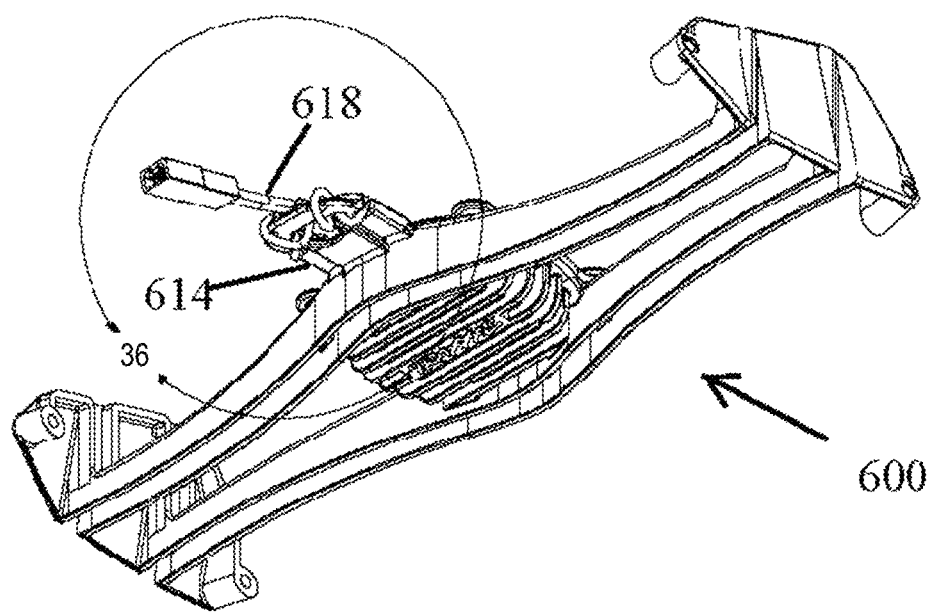
Figure 36:
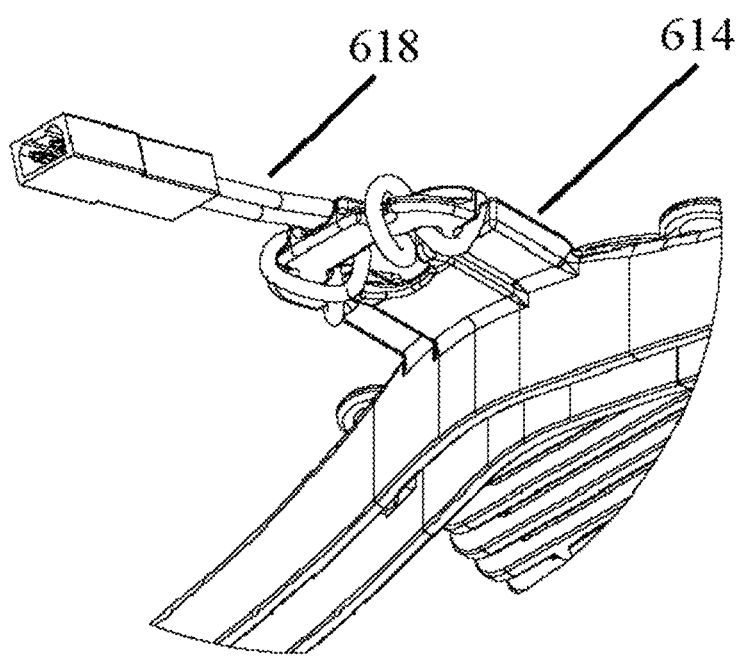

FIG. 34 illustrates a detail of the wiring 618 wrapped through the strain relief member 614, as illustrated in more detail in FIG. 33. A first electrical wire 618A may be electrically coupled to first terminal 112A of outlet plate 110. A second electrical wire 618B may be electrically coupled to second terminal 112B of outlet plate 110. The first electrical wire 618A may be routed from the first terminal 112A downward through first rearward notch 617A, upward through first auxiliary aperture 623A, forward and downward through first forward notch 619A, upward through main aperture 621, and forward through passage 625 formed between guides 627A and 627B. The second electrical wire 618B may be routed from the second terminal 112B downward through second rearward notch 617B, upward through second auxiliary aperture 623B, forward and downward through second forward notch 619B, upward through main aperture 621, and forward through passage 625 formed between guides 627A and 627B. FIG. 35 shows another view of an exemplary mounting apparatus, such as fifth mounting apparatus 600, in perspective illustrating the area in which the strain relief member 614 may be located at the center front of a mounting apparatus, such as the fifth mounting apparatus 600. FIG. 36 illustrates a detail of the wiring 618 wrapped through the strain relief member 614, and may be essentially the same as that described with respect to FIG. 32 viewed from an underside thereof.

Figure 37:
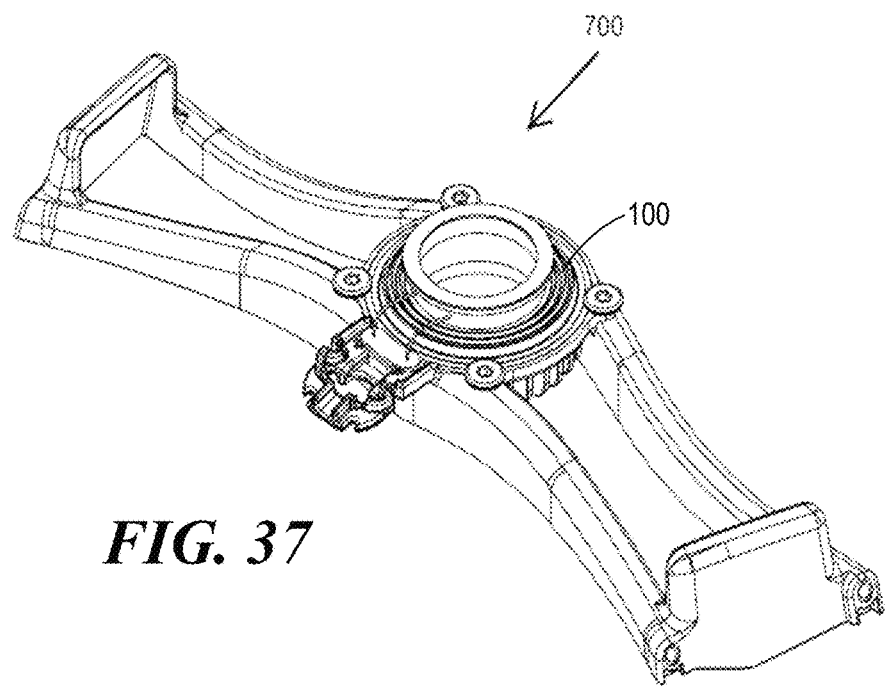
FIG. 37 is a perspective view of a sixth mounting apparatus.
Figure 38:
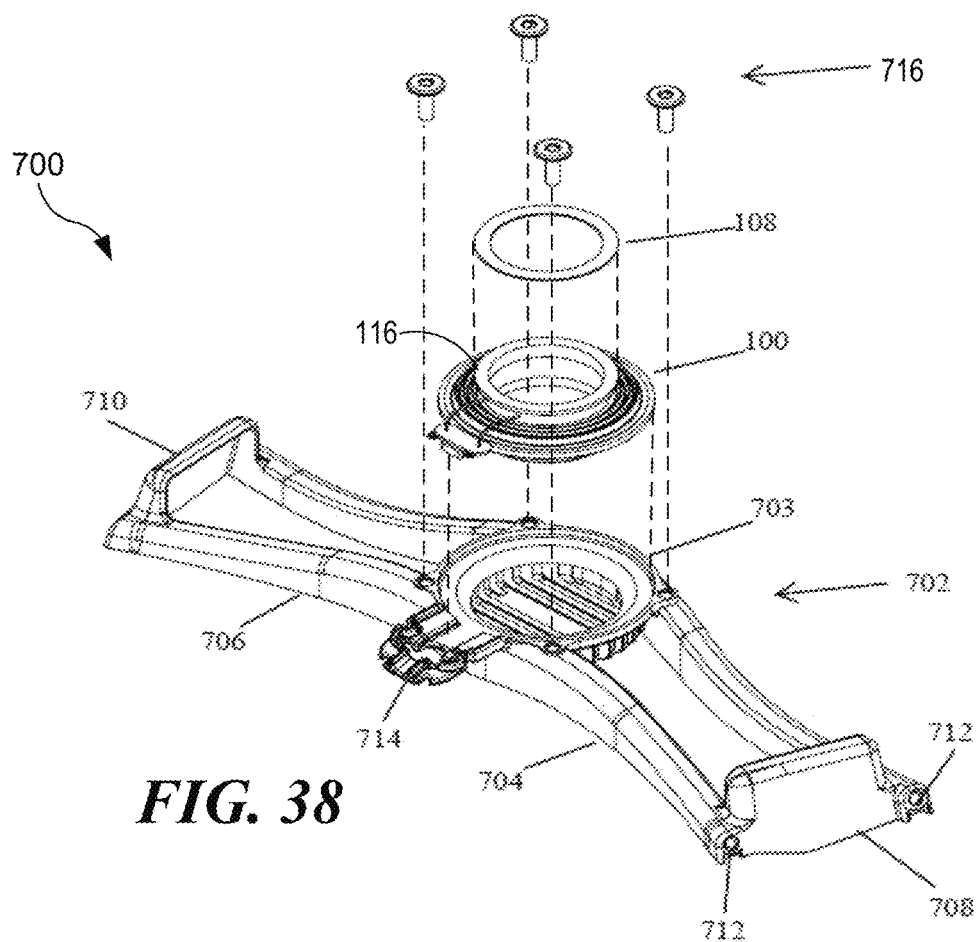
FIG. 38 is an exploded view of the sixth mounting apparatus.
Figure 39:
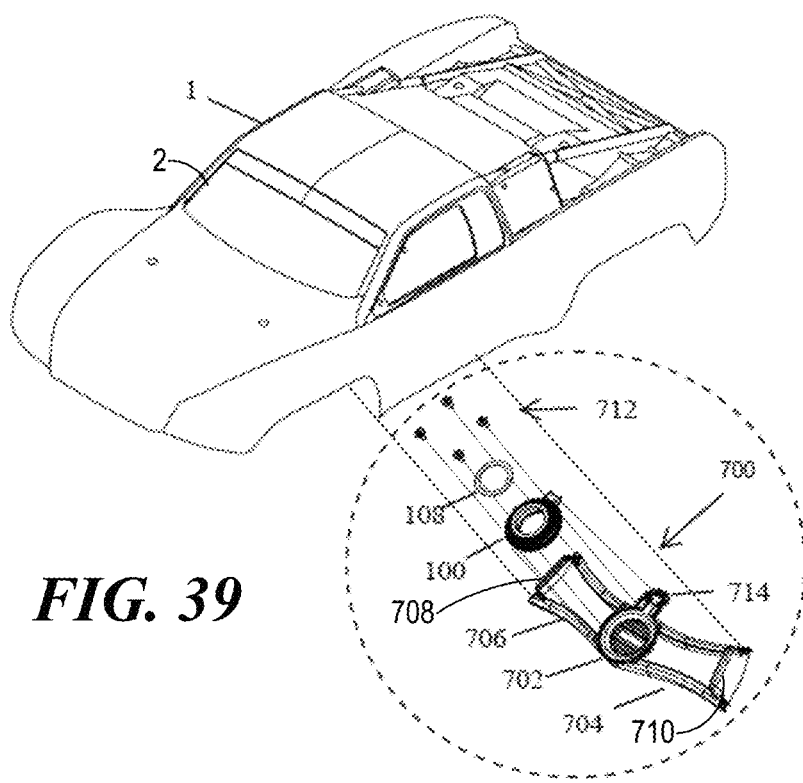
FIG. 39 is an exploded view of the sixth mounting apparatus, and a model vehicle body.
Figure 40:
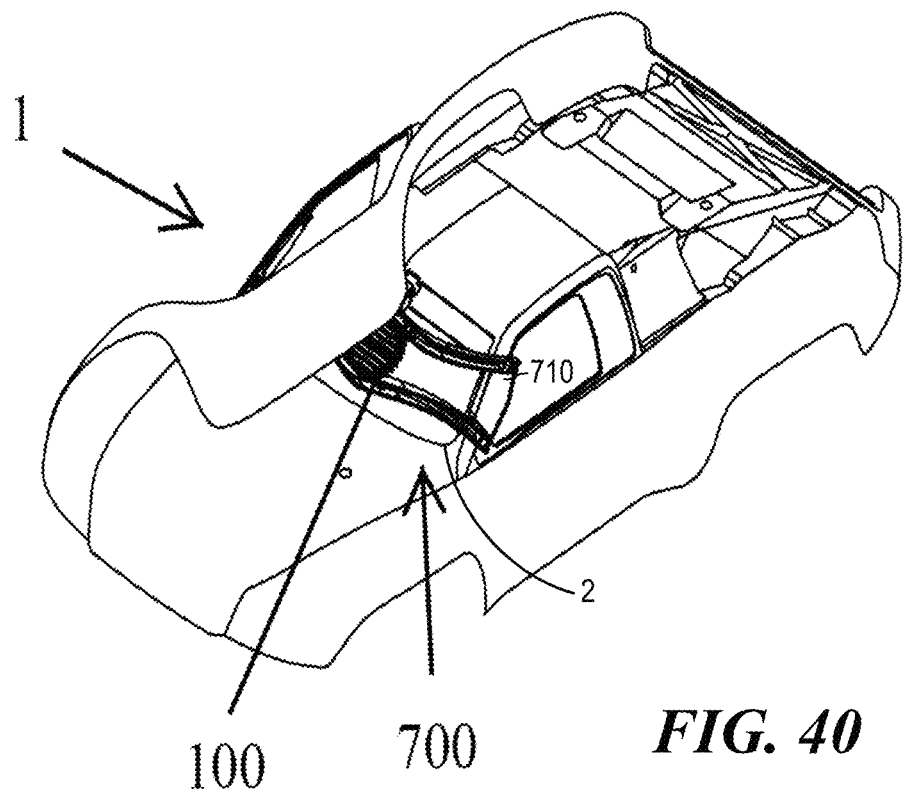
FIG. 40 is a perspective view of a model vehicle body showing the sixth mounting apparatus installed.
Figure 41:
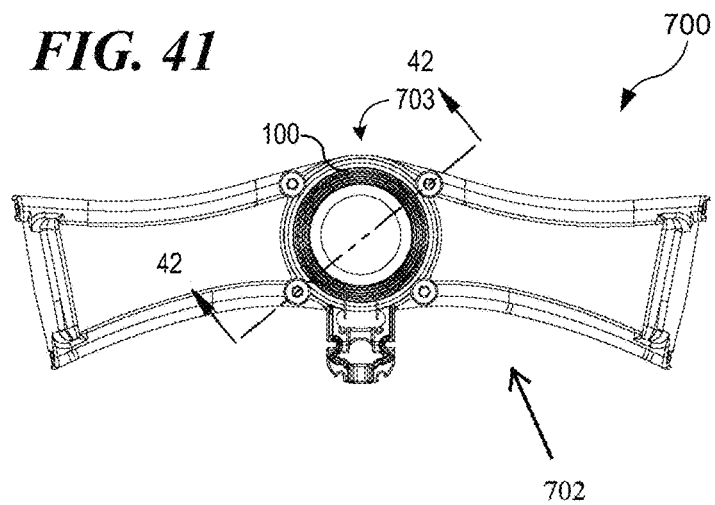
FIG. 41 is a top view of the sixth mounting apparatus.

Turning now to FIGS. 37-38, a sixth mounting apparatus 700 for an audio exciter 100, is shown in multiple perspective representations supporting audio exciter 100. The sixth mounting apparatus 700 may be configured to extend the interior width of a model vehicle body, from side-to-side, for example, and support the audio exciter 100 from its back side, or housing 106 (FIG. 1A) at a suitable distance from the body of the model vehicle such that the adhesive ring 108 of the audio exciter 100 may be affixed to a panel, such as a windshield, of the model vehicle body. The sixth mounting apparatus 700 may have a mount 702 having a mounting portion 703 for supporting the audio exciter 100. The mounting portion 703 may be supported by at least one transverse supporting arm 704 extending the interior width of a model vehicle body. In the embodiment shown in FIG. 38, two transverse supporting arms 704 and 706 extend from the mounting portion 703, and terminate in mounting plates 708 and 710. The audio exciter 100 may be secured into the mounting portion 703 by retention members such as screws 716 installed around the perimeter of the audio exciter 100, or retained by retention members such as detents as described above with respect to FIGS. 2, 5, 6, and 9, for example. As shown in FIG. 39 and FIG. 40, and with reference to FIG. 38, the mounting plates 708 and 710 may be secured to the interior portion of a model vehicle body by any suitable mechanical means using mounting holes 712, and the adhesive ring 108 on the central ring body 114 of audio exciter 100 may affix to an interior panel of a model vehicle body 1. A strain relief feature 714 may be a loop-like structure provided in a sixth mounting apparatus 700, for wrapping wiring through the feature 714 to form a strain relief. FIG. 40 shows the sixth mounting apparatus 700 mounted to a front portion of the underside of model vehicle body 1, behind the windshield 2 of the model vehicle body 1.

The sixth mounting apparatus 700 may allow the audio exciter 100 to move its voice coil at full-throw, but not allow the flexible element 102 (FIG. 1A) to be damaged during impacts or extreme operating conditions. Because of the relatively long transverse supporting arms 704 and 706, the audio exciter 100 has a larger area and wider portion of the body to excite. As a result, the sound produced by audio exciter 100 and sixth mounting apparatus 700 is not significantly different from the sound produced by mounting audio exciter 100 to the body by adhesive ring 108 alone, such as the "simple flat" configuration of FIG. 1C.

Figure 42:
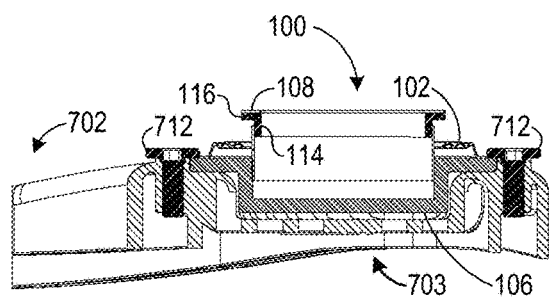
FIG. 42 is a sectional view of the sixth mounting apparatus taken along the lines 36-36 in FIG. 35.
Figure 43:
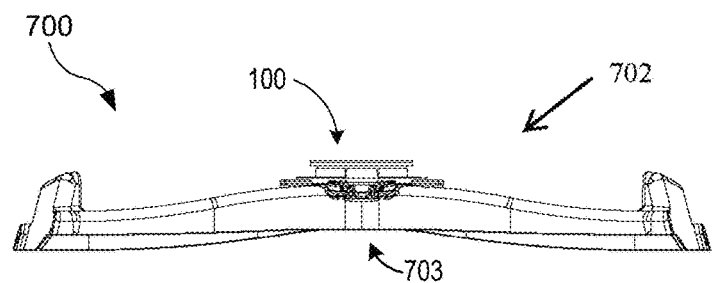
FIG. 43 is a front view of the sixth mounting apparatus.
Figure 44:
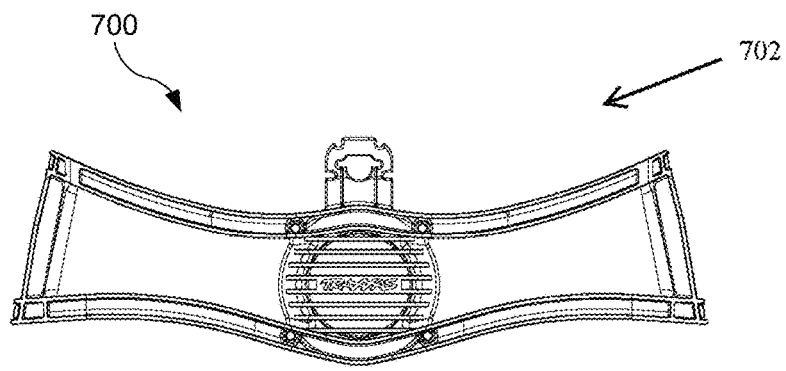
FIG. 44 is a bottom view of the sixth mounting apparatus.
Figure 47:
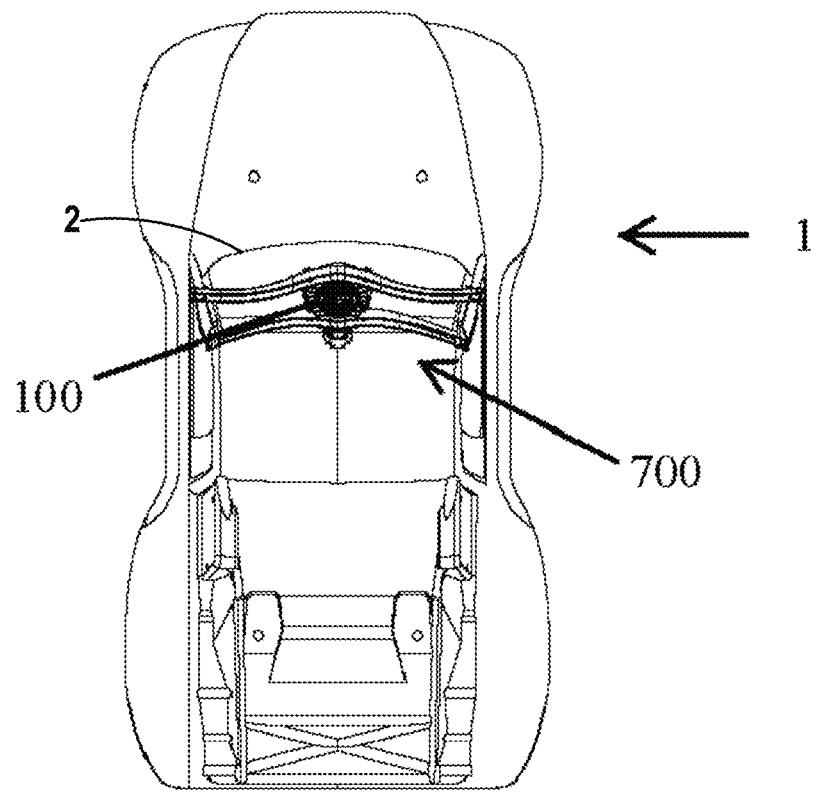
FIG. 47 is a bottom view of a model vehicle body showing the sixth mounting apparatus installed.

Turning now to FIGS. 41-44, FIG. 41 is a top view of the sixth mounting apparatus 700 showing the circular mounting portion 703 for supporting the audio exciter 100. FIG. 42 is a sectional view of the sixth mounting apparatus 700 taken along the lines 42-42 in FIG. 41, and illustrates audio exciter 100 secured within circular mounting portion 703 by suitable retention members such as screws 712. The central ring body 114 is shown with broad upper portion 116 having adhesive mounting ring 108 affixed thereon. Flexible element 102 may vibrate freely and respond to electrical signals applied to the audio exciter 100. FIG. 43 is a front view of the sixth mounting apparatus 700. FIG. 44 is a bottom view of the sixth mounting apparatus 700. As shown in FIG. 45 and FIG. 46, the sixth mounting apparatus 700 may be installed in a front portion of the model vehicle body 1, behind the windshield 2 of the model vehicle body 1, and secured with suitable fasteners such screws 720.

The audio exciter 100 may not be fully sealed in the sixth mounting apparatus 700, and may be partially exposed to the environment. The internal portions of the audio exciter 100 are sealed against the entry of contaminants. Using the adhesive ring 108 on the plastic mounting tab 116 (FIG. 42) to attach to the model vehicle body 1 effectively seals the internal portions of the audio exciter 100 against the entry of contaminants.

Figure 48:
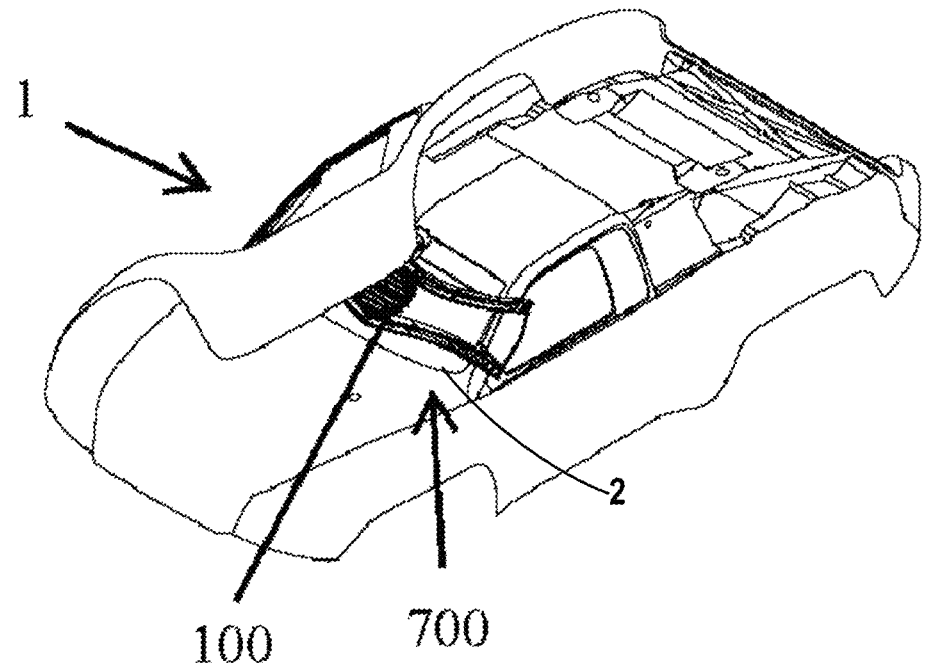
FIG. 48 is a perspective view a model vehicle body showing the sixth mounting apparatus installed.
Figure 49:
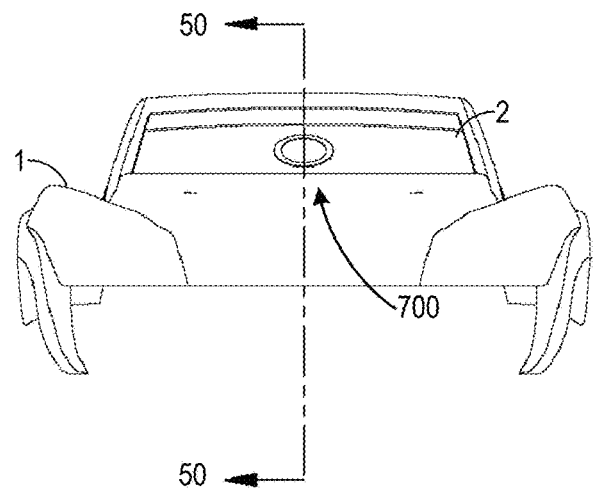
FIG. 49 is a front view of a model vehicle body.
Figure 50:
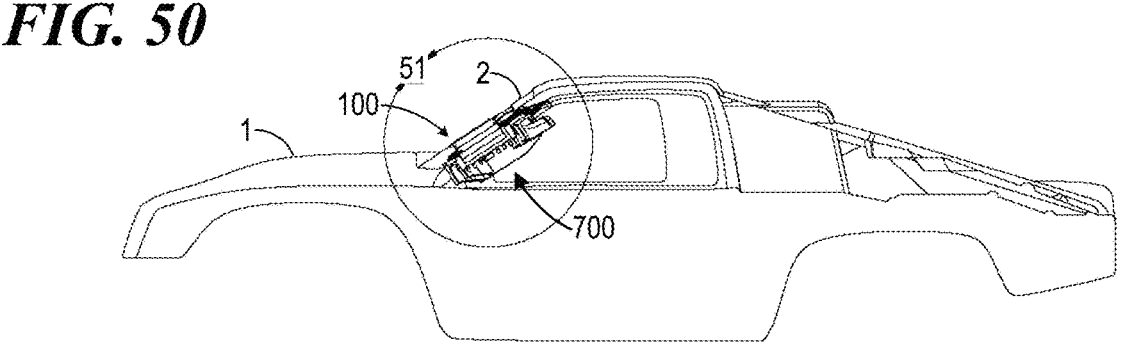
FIG. 50 cross-section of the body for a model vehicle taken along the lines 50-50 in FIG. 49.
Figure 51:
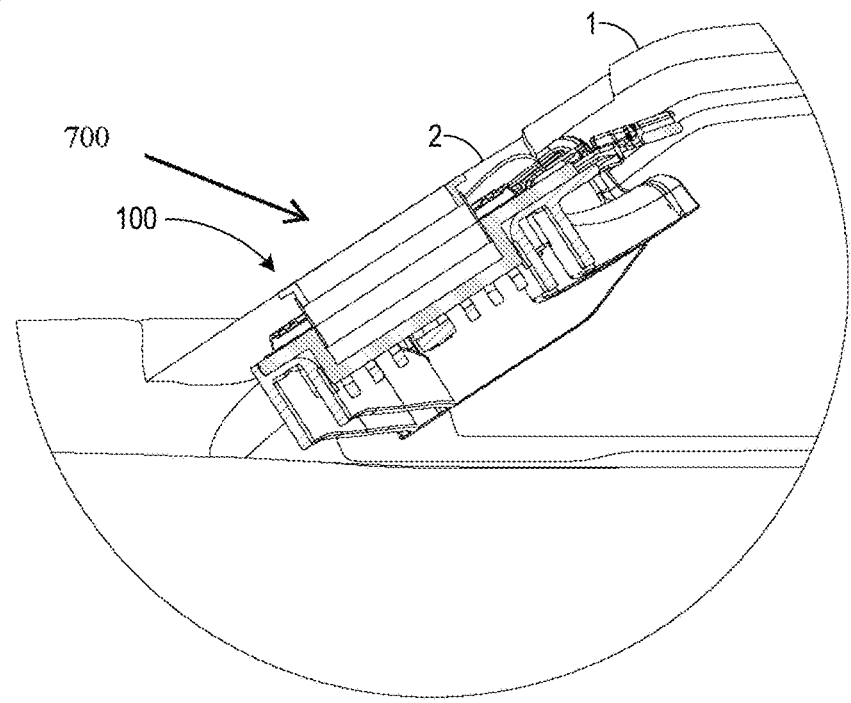
FIG. 51 is a detail of FIG. 50.

Turning now to FIGS. 47-51, FIG. 47 is a bottom view of a model vehicle body showing the sixth mounting apparatus 700 installed in a front position of model vehicle body 1, behind the windshield 2. FIG. 48 is a perspective view of a model vehicle body showing the sixth mounting apparatus 700 installed in a front position of model vehicle body 1, behind the windshield 2. FIG. 49 is a front view of a model vehicle body. FIG. 50 is a cross-section of the body for a model vehicle taken along the lines 50-50 in FIG. 49, showing the sixth mounting apparatus 700 installed in a front position of model vehicle body 1, behind the windshield 2. FIG. 51 is a detail of FIG. 50, showing the sixth mounting apparatus 700 installed in a front position of model vehicle body 1, behind the windshield 2.

Turning now to FIGS. 52-57, a seventh mounting apparatus 800 for an audio exciter may be adjustable to fit into different model vehicle bodies having different widths, shapes, or contours, so it can be mounted to many different shapes and sizes of model vehicle bodies. The seventh mounting apparatus 800 may be adjustable to extend the interior width of different model vehicle bodies having different widths from side-to-side, for example, and support the audio exciter 100 from its back side, or housing 106 (FIG. 1A) at a suitable distance from the body of the model vehicle 1 such that the adhesive ring 108 of the audio exciter 100 may be affixed to a panel of the model vehicle body 1. The seventh mounting apparatus 800 may have mounting portion 802 for supporting the audio exciter 100. Suitable fasteners, such as screws 808, may secure the audio exciter 100 to the circular mounting portion 802 as described hereinbefore. The mounting portion 802 may be supported by at least one transverse supporting arm 804 extending at least a portion of the interior width of a model vehicle body.

Figures 52, 53:
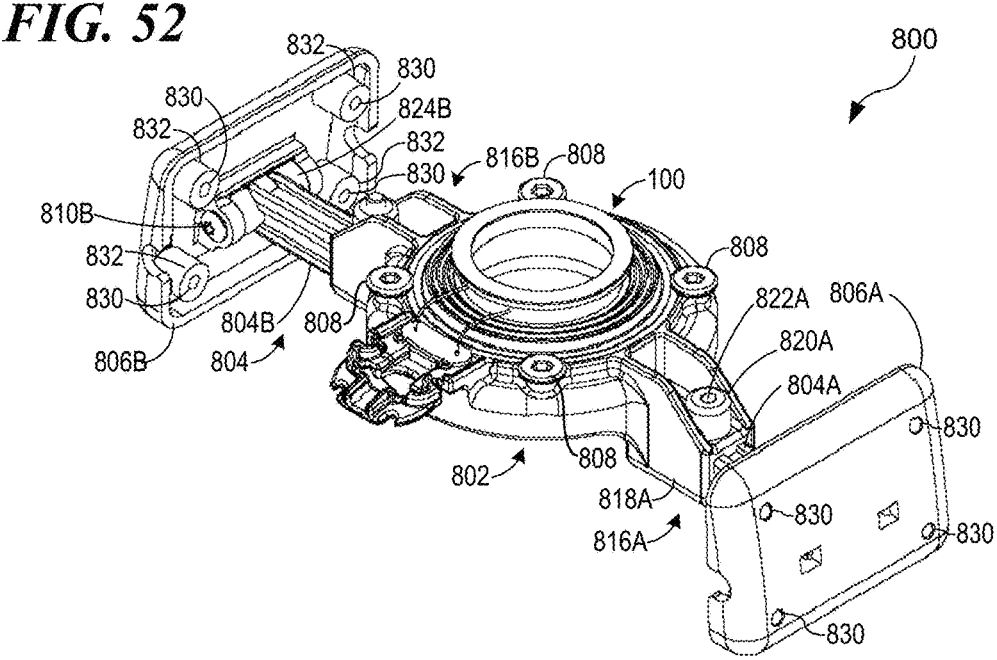
FIG. 52 is a perspective view illustrating a seventh mounting apparatus for an audio exciter.
FIG. 53 is an exploded view of the seventh mounting apparatus.
Figure 54:
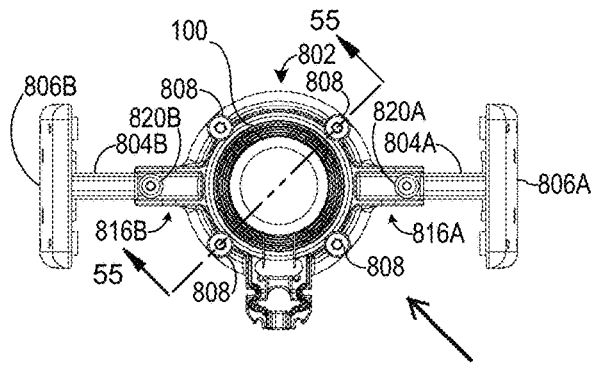
FIG. 54 is a top view of the seventh mounting apparatus.

In the embodiment shown in FIGS. 52-53, two transverse supporting arms 804A and 804B may extend from the mounting portion 802, and may terminate in bosses 824A, 824B for supporting mounting plates 806A and 806B. In an aspect of the invention, the two transverse supporting arms 804A and 804B may extend a certain distance depending upon the lengths of transverse supporting arms 804A and 804B, which may be formed at a particular length for use in a particular circumstance or incidence. In an aspect of the invention, the two transverse supporting arms 804A and 804B may extend a variable distance depending upon their position within circular mounting portion 802 and retention thereat by mounting screws 812A, 812B.

More particularly, with reference to FIG. 53, the supporting arm 804A may be inserted into a first receiving channel 814A formed within a first transverse receiving portion 816A of mounting portion 802. The first receiving channel 814A may be a regular cavity within a structure of a first transverse receiving portion 816A supported by at least one extending member, such as wall 818A. The first transverse receiving portion 816A may have a boss 820A having a threaded aperture 822A therethrough for receiving mounting screw 812A. In an embodiment as shown, the first receiving channel 814A may be a regular cavity in the respect that its internal cross-sectional shape is continuous through a certain distance. A similar transverse receiving portion 816B of mounting portion 802 may be provided on an opposite side of the mounting portion 802 from the first transverse receiving portion 816A, and may include correspondingly similar or identical features such as a second receiving channel 814B, which may be a regular cavity within a structure of the second transverse receiving portion 816B, having a boss 820B having a threaded aperture 822B therethrough for receiving mounting screw 812B. The internal cross-sectional shape of the regular cavity may correspond to the external cross-sectional shape of transverse supporting arm 804A, 804B. In an aspect of the invention, the transverse supporting arms 804A, 804B may be secured in a desired position by aligning a passage 828A, 828B formed through supporting arm 804A, 804B with threaded aperture 822A, 822B formed in bosses 820A, 820B, inserting screws 812 through passages 828A, 828B and threading into threaded apertures 822A, 822B.

In an embodiment as shown in FIGS. 52-53, the seventh mounting apparatus 800 may be provided with end plates 806A, 806B for securing the seventh mounting apparatus 800 to an interior portion of a model vehicle, or other suitable location. As best illustrated with respect to end plate 806A, end plates 806A, 806B may have apertures 830 in outward-facing surfaces thereof, which may be threaded for receiving a suitable fastener. As shown best with respect to end plate 806B, such apertures 830 may be passages through bosses 832 protruding inwardly from an inward surface of end plates 806B, 806A. Such apertures may be arranged in a pattern. The pattern may be standard pattern, reproducible in one or more different model vehicle bodies. The end plates 806A, 806B may be secured to their respective supporting arms, 804A, 804B, by suitable fasteners such as screws 810A, 810B. As best illustrated with respect to end plate 806B, end plates 806A, 806B may have at least one mounting structure 834 (FIG. 53), which may be a protruding structure providing an aperture 836 therethrough. As shown in FIG. 50, the end plates 806A, 806B may have mounting structures 834 at spaced-apart locations on an inward-facing side thereof, corresponding to a length of mounting bosses 8024A, 824B. Spaced-apart mounting structures 834 may be aligned with mounting bosses 824A, 824B such that apertures 836 may be aligned with passages 838A, 838B, and the end plates 806A, 806B secured to supporting arms 804A, 804B by suitable fasteners, such as screws 810A, 810B. In an embodiment, end plates 806A, 806B may be pivotably adjustable around mounting boss 824A, 824B and mounting screw 810A, 810B. In an embodiment, end plates 806A, 806B, may be secured at a particular angle with respect to support arm 804A, 804B. In an embodiment, end plates 806A, 806B, may be secured at a particular angle by tightening screw 810A, 810B.

Figure 55:
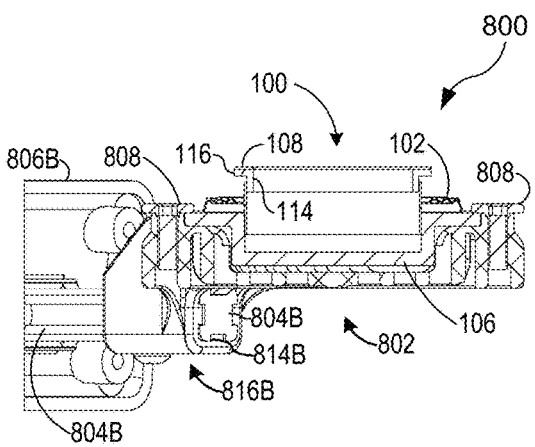
FIG. 55 is a sectional view of the seventh mounting apparatus taken along the lines 55-55 in FIG. 54.
Figure 56:
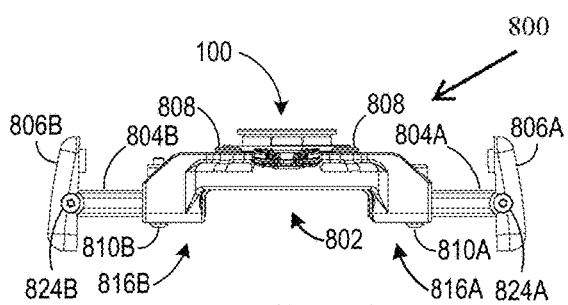
FIG. 56 is a front view of the seventh mounting apparatus.
Figure 57:
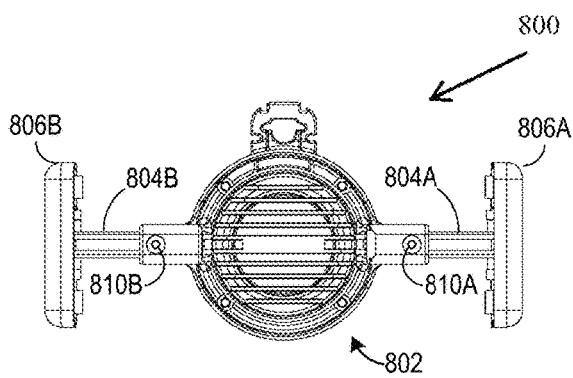
FIG. 57 is a bottom view of the seventh mounting apparatus.

Turning now to FIGS. 54-57, FIG. 54 is a top view of the seventh mounting apparatus 800 showing the mounting portion 802 for supporting the audio exciter 100. Audio exciter 100 may be secured to mounting portion 802 by retention members such as screws 808. End plates 806A, 806B may be mounted to distal ends of support arms 804A, 804B, which may be secured within transverse mounting portions 816A, 816B by suitable fasteners passing through mounting bosses 820A, 820B. FIG. 55 is a sectional view of the seventh mounting apparatus 800 taken along the lines 55-55 in FIG. 54, and illustrates audio exciter 100 secured within mounting portion 802 by retention members 808, which may be any suitable mechanical fasteners such as screws. The central ring body 114 is shown with broad upper portion 116 having adhesive mounting ring 108 affixed thereon. Flexible element 102 may vibrate freely and respond to electrical signals applied to the audio exciter 100. A portion of end plate 806B may be seen affixed to support arm 804B wherein a proximal end of support arm 804B may be secured within the channel 814B. FIG. 56 is a front view of the seventh mounting apparatus 800, illustrating the audio exciter 100 secured within mounting portion 802 by suitable fasteners such as screws 808. End plates 806A, 806B are shown as pivotably mounted to bosses 824A, 824B on the ends of support arms 804A, 804B, respectively. FIG. 57 is a bottom view of the seventh mounting apparatus 800. End plates 806A, 806B may be mounted to distal ends of support arms 804A, 804B, wherein proximal ends of support arms 804A, 804B may be secured within transverse receiving portions 816A, 816B by suitable fasteners such as screws 810A, 810B.

As shown in FIG. 55, the audio exciter 100 may be secured into the mounting portion 802 by retention members such as screws 808 installed around the perimeter of the audio exciter 100, or retained by retention members such as detents as described above with respect to FIGS. 2, 5, and 6, for example. FIG. 55 is a cross-sectional view that illustrates audio exciter 100 secured within mounting portion 802 by suitable fasteners such as screws 808. The central ring body 114 is shown with broad upper portion 116 having adhesive mounting ring 108 affixed thereon. Flexible element 102 may vibrate freely and respond to electrical signals applied to the audio exciter 100. Referring to FIGS. 56-57, the mounting plates 806A and 806B may be secured to the interior portion of a model vehicle body by any suitable mechanical means, and the adhesive ring 108 on the central ring body 114 (FIG. 55) of audio exciter 100 may affix to an interior panel of a model vehicle body in a manner similar to that shown in FIG. 21-26 with respect to fifth mounting apparatus 600 or in FIG. 43-46 with respect to sixth mounting apparatus 700.

Turning now to FIGS. 58-63, an eighth mounting apparatus 900 may be generically designed to be installed in any one of several model vehicle bodies. The eighth mounting apparatus 900 may embody a more universal design that may be used on any suitable surface of a model vehicle body.

Figure 58:
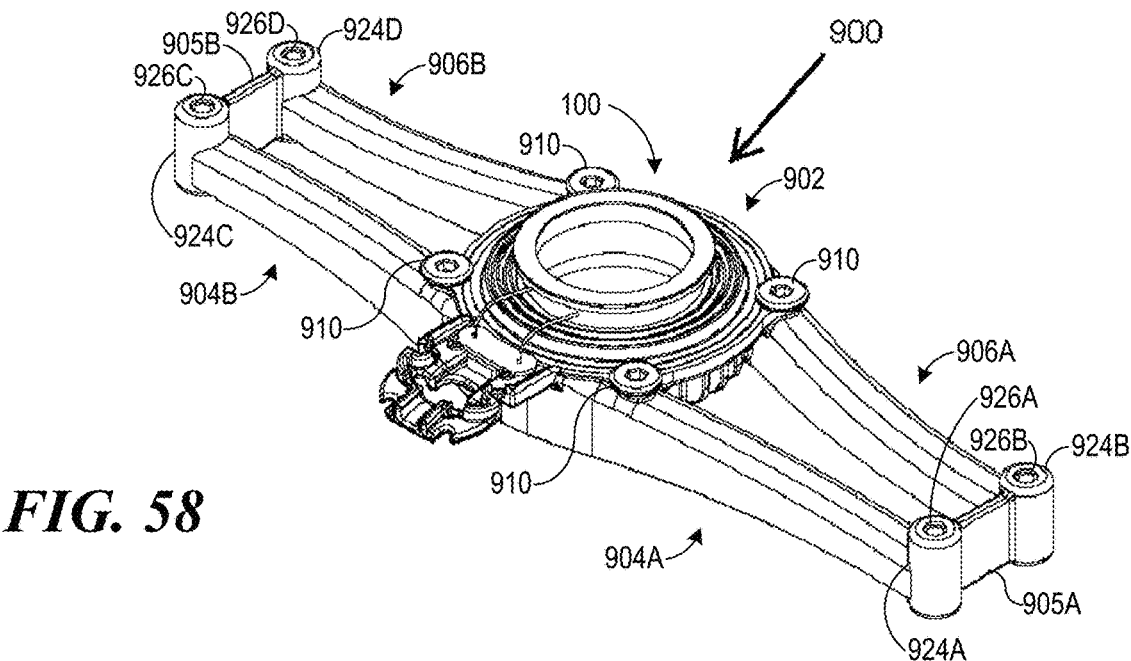
FIG. 58 is a perspective view of an eighth mounting apparatus for an audio exciter.
Figure 59:
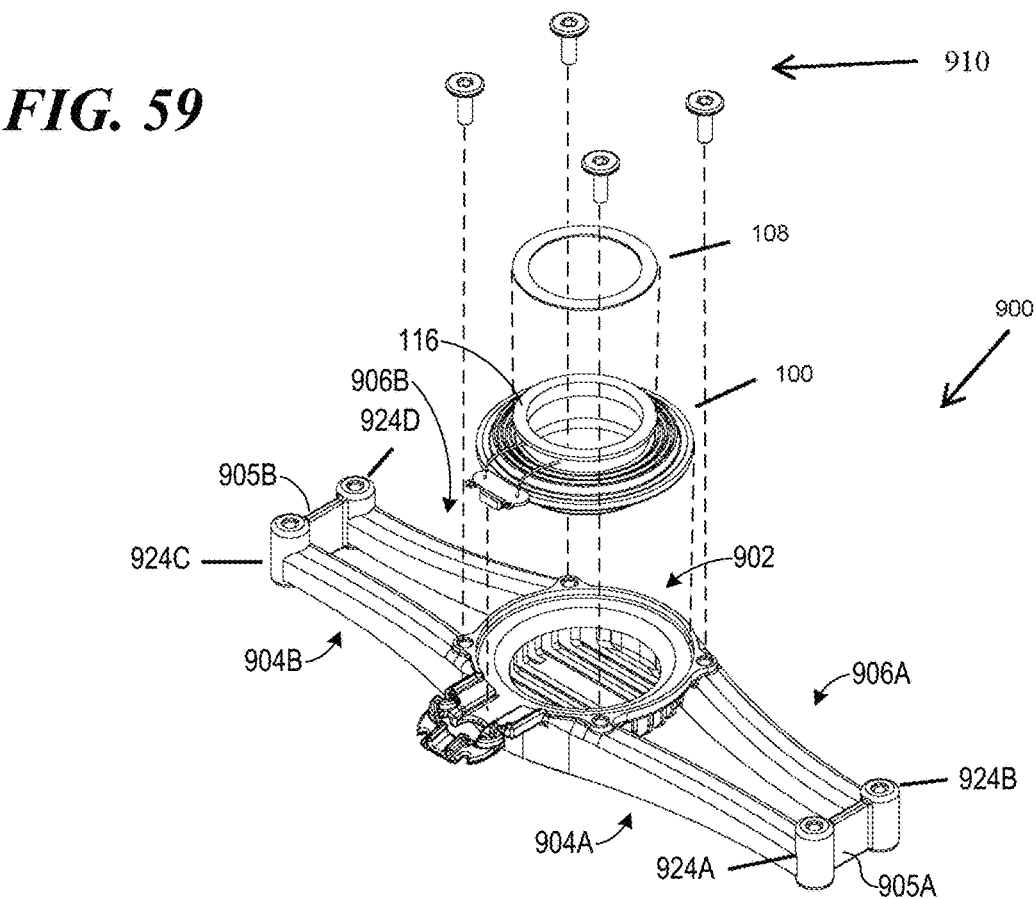
FIG. 59 is an exploded view of the eighth mounting apparatus.

As shown in FIGS. 58-59, an embodiment of an eighth mounting apparatus 900 may be a generically-designed, eighth mounting apparatus 900, which may have four bosses 924, spaced apart at four corners of a rectangle formed by the corners of the eighth mounting apparatus 900 for attaching the eighth mounting apparatus 900 to a model vehicle body.

More particularly, and with respect to FIG. 58, the eighth mounting apparatus 900 may have mounting portion 902 for supporting the audio exciter 100. Suitable retention members, such as screws 910, may secure the audio exciter 100 to the mounting portion 902 as described hereinbefore. The mounting portion 902 may be supported by at least one transverse supporting arm 904 or 906 extending a given width, to be received within a model vehicle body. In the embodiment shown in FIGS. 58-63, there may be at least two forwardly-placed transverse supporting arms 904A, 904B extending from the circular mounting portion 902 and forming at least one transverse supporting arm 904. In an embodiment, the at least one, forwardly-placed transverse supporting arm 904 may extend the approximate width of the interior portion of the model vehicle body in which the eighth mounting apparatus 900 is intended to be placed. In the embodiment shown in FIGS. 58-63, there may be at least two rearwardly-placed transverse supporting arms 906A, 906B extending from the mounting portion 902 and forming at least one transverse supporting arm 906. In an embodiment, the at least one, rearwardly-placed transverse supporting arm 906 may extend the approximate width of the interior portion of the model vehicle body in which the eighth mounting apparatus 900 is intended to be placed. Each of the transverse supporting arms 904A, 904B and 906A, 906B may support an integrally-formed boss 924 at a distal end thereof, and two adjacent bosses, such as bosses 924A and 924B, and such as bosses 924C and 924D, may be interconnected by an integrally formed wall 905A, 905B. The four bosses 924 may therefore be spaced apart at four corners of a rectangle formed by the corners of the eighth mounting apparatus 900 for attaching the eighth mounting apparatus 900 to a model vehicle body. The bosses 924A, 924B 924C, 924D may be provided with passages 926A, 926B, 926C, 926D, respectively, extending lengthwise through the middle of the bosses 924A, 924B 924C, 924D for receiving suitable fasteners or other mounting hardware as desired. The passages 926A, 926B, 926C, 926D may be threaded for receiving mounting screws.

With respect to FIG. 59, the audio exciter 100 may be placed into mounting portion 902 and secured using suitable fasteners such as screws 910. Adhesive ring 108 may be affixed to the top surface 116 of the audio exciter 100. The eighth mounting apparatus 900 may be installed into a model vehicle body adapting to the provisions of bosses 924A, 924B 924C, 924D.

Turning now to FIGS. 60-63, FIG. 60 is a top view of the eighth mounting apparatus 900 showing the mounting portion 902 for supporting the audio exciter 100. Audio exciter 100 may be secured to mounting portion 902 by retention members such as screws 910. Distal ends of support arms 904A, 904B and 906A, 906B may support mounting bosses 924A, 924B, 924C, and 924D. FIG. 61 is a sectional view of the eighth mounting apparatus 900 taken along the lines 61-61 in FIG. 60, and illustrates audio exciter 100 secured within mounting portion 902 by suitable retention members such as screws 910. The central ring body 114 is shown with broad upper portion 116 having adhesive mounting ring 108 affixed thereon. Flexible element 102 may vibrate freely and respond to electrical signals applied to the audio exciter 100. FIG. 62 is a front view of the eighth mounting apparatus 900, illustrating the audio exciter 100 secured within mounting portion 902 by suitable retention members such as screws 910. FIG. 63 is a bottom view of the eighth mounting apparatus 900, which may be secured to a model vehicle body utilizing passages 926A-926D as formed through mounting bosses 924A-924D, respectively, using any suitable hardware.

As shown in FIG. 61, the audio exciter 100 may be secured into the circular mounting portion 902 by retention members such as screws 910 installed around the perimeter of the audio exciter, or retained by retention members such as detents as described above with respect to FIGS. 2, 5, and 6, for example. Referring to FIGS. 62-63, the eighth mounting apparatus 900 may be secured to the interior portion of a model vehicle body by any suitable mechanical means, and the adhesive ring 108 on the central ring body 114 of audio exciter 100 may affix to an interior panel of a model vehicle body in a manner similar to that shown in FIG. 22-26 or FIG. 29-31 with respect to fifth mounting apparatus 600 or in FIG. 39-40 and FIG. 45-51 with respect to sixth mounting apparatus 700.

Each of the preceding embodiments of mounting apparatus for an audio exciter 100 provide different levels of protection, mounting and quality of sound for an audio exciter for use in a model vehicle. Several of the preceding embodiments 600-900 feature mounting arms extending from a simple, circular mount similar to embodiment 200. It should be understood that each of the embodiments 600-900 featuring mounting arms may utilize one of the more complex circular mounts 300-500 in the central mounting position for the audio exciter 100. Each embodiment and variation thereof allows for the audio exciter 100 to be moved from one model vehicle body to another model vehicle body. Also, each of the embodiments of mounting apparatus allow individual mounting components to be replaced or changed if damaged and still be able to use the same exciter. The embodiments of mounting apparatus disclosed herein allow for a single type of exciter to be easily installed on several different types of model vehicle bodies, and at many different locations while still allowing for a very durable and reliable operation in varied types of environments and driving operations.

Electrical Operation

A Radio Control (R/C) vehicle sound simulation system may utilize user input from a Radio Control (R/C) vehicle transmit controller, together with vehicle state, to generate realistic vehicle sounds. An R/C vehicle transmit controller may include a plurality of control channels. For example, in an embodiment, the vehicle transmit controller may recognize different control channels dedicated to steering control (Channel 1), throttle control (Channel 2), clutch control (Channel 3), sound system control (Channel 4), and the like. In alternative embodiments, fewer, additional, or different control channels may be implemented. Further, a single control channel may perform more than one control function, or, alternatively, more than one control channel may perform the same control functions.

In an embodiment, control may be implemented using one or more switches, one or more potentiometers, or other like components. Alternatively, in an embodiment, a combination of such components may be utilized to control the sound simulation system.

A fourth (4th) control channel, Channel 4, may be provided to implement sound simulation system control. The fourth (4th) control channel may be used to remotely control the sound simulation system. For example, the fourth (4th) control channel may be used to activate or deactivate the sound simulation system, to adjust the volume, or other similar control operations.

In an alternative embodiment, sound simulation system control may be implemented through user input through another control channel, such as Channel 3, for example, based on how the user provides the input to Channel 3. The sound simulation system may be implemented with logic to interpret specific user inputs, such as switch toggling and the like, as a control command controlling the sound system.

Figure 64:
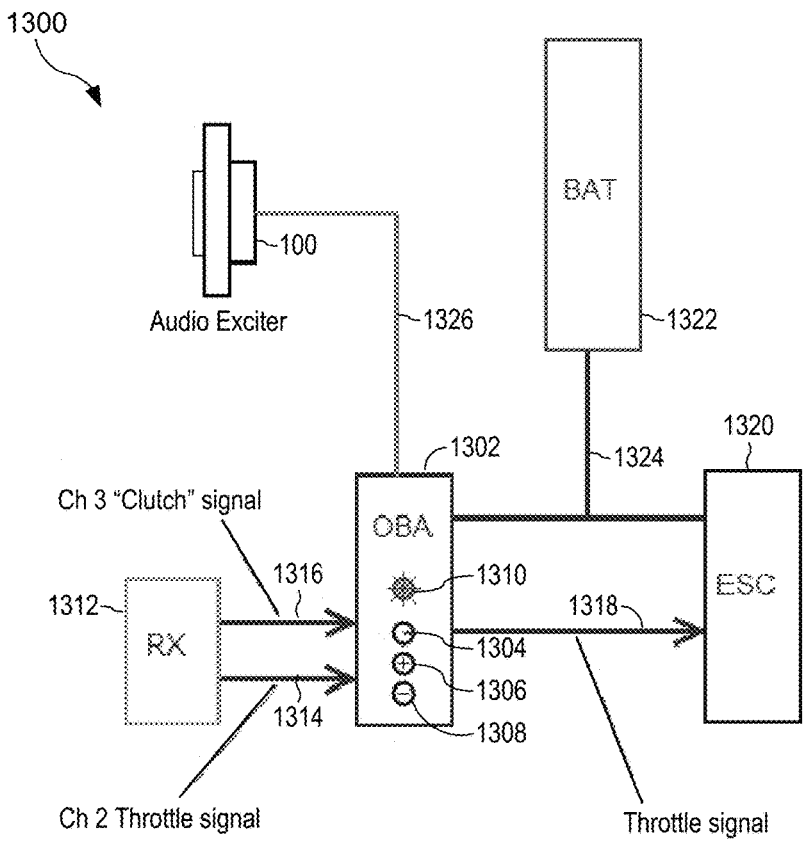
FIG. 64 illustrates a system for operating an audio exciter.
Figure 65:
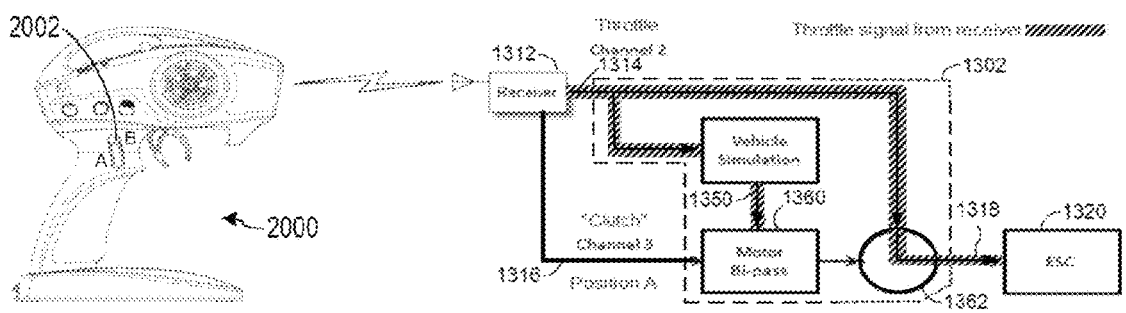
FIG. 65 is a block diagram illustrating a first mode of operation of the system for operating an audio exciter.

For example, a quick double-toggle of a two-position switch may turn on or turn off the sound. Referring to FIGS. 64 and 65, in an embodiment, with the switch in position B, the user may toggle to A, to B, to A and then back to B. If the switch is toggled in such a manner within a specified time period, perhaps within 1 second, the OBA module 1302 may be programmed to interpret the input as a command to turn on or turn off the sound system. A triple toggle, quadruple toggle, etc. may alternatively be used.

This manner of control, through toggling, may also be used for other control methods. For example, toggling, or another similar user input, may be interpreted to command the OBA module 1302 to cycle through a plurality of preset volume settings. For example, the OBA module 1302 may store predefined settings corresponding to a plurality of volume levels, such as 0%, 25%, 50%, 75%, and 100% volume.

Turning now to FIG. 64, an audio system 1300 for a model vehicle may comprise an On-Board Audio (OBA) controller module 1302, which controls operation of the audio exciter 100. To interface with a user, the OBA controller module 1302 may be provided with certain controls and indicators, for example: a "Power" button 1304, a "Volume Up" button 1306, a "Volume Down" button 1308, and an LED indicator 1310 of some color, such as green, for example. The OBA module 1302 may receive signals from a receiver 1312, for example, a Throttle signal 1314 may be recognized on a first control channel (Channel 2), and a Clutch signal 1316 may be recognized on a second control channel (Channel 3). The OBA module 1302 may provide the Throttle signal 1318 to an Electronic Speed Control (ESC) module 1320. The OBA module 1302 and the ESC module 1320 may both receive operating power from a Battery (BAT) 1322 via suitable electrical conductors 1324. The OBA module 1302 may be connected to the audio exciter 100 via suitable electrical conductors 1326. In an embodiment, the OBA module 1302 may produce audio signals for reproduction by the audio exciter 100 based upon the input Throttle signal 1314 and the input Clutch signal 1316, and may also provide a Throttle signal 1318 to ESC module 1320. The volume level of the audio output may be adjusted by a user by pressing either the Volume Up button 1306 or the Volume Down button 1308. The OBA module 1302 may be turned on or off by pressing the Power button 1304. An operating condition of the OBA module 1302 may be indicated by the LED indicator 1310, for example, the LED indicator 1310 may be lit to indicate the OBA module 1302 is on, and may change color to indicate proper or faulty operating conditions. For example, proper operation of the OBA module 1302 may be indicated by a green LED indicator 1310 that is lit.

Neutral Engine Effects

Certain vehicle sound simulations may be made to sound more realistic in situations in which the vehicle's engine is decoupled from the rest of the drivetrain, such as when the transmission is in neutral or when the clutch is depressed. For example, the sound of the engine starting or the sound of the engine revving while in neutral will add to the realism of the vehicle sound simulation. Also, the behavior of a vehicle may be different in certain situations, such as revving the engine while in neutral, for example, than the behavior of a vehicle when the same engine activity is conducted while coupled to the drive train, or not in neutral.

Figure 66:
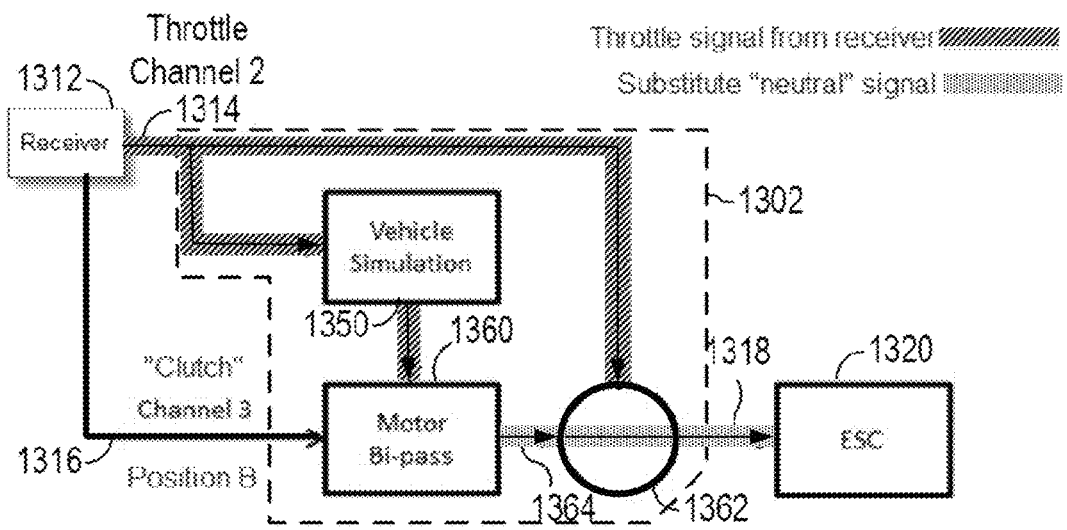
FIG. 66 is a block diagram illustrating a second mode of operation of the system for operating an audio exciter.
Figure 67:
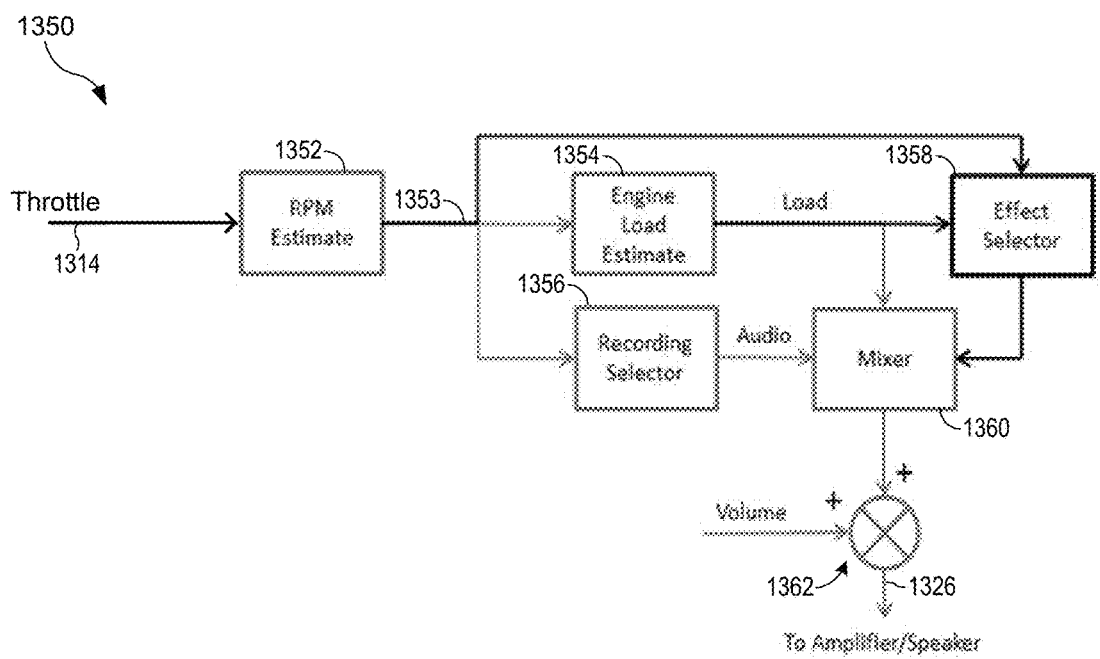
FIG. 67 is a block diagram illustrating a vehicle simulation system.

Turning now to FIGS. 66 and 67 block diagrams illustrate a process which allows the electric motor control to be bypassed in certain situations. As shown in FIG. 66, a Radio Control (R/C) vehicle transmit controller 2000 may have an additional channel on the transmitter, represented as Channel 3 in FIG. 64-65. A switch 2002 on the transmit controller 2000 may be used to operate Channel 3. Using the Channel 3, "Clutch" channel, the user may "decouple the engine from the drivetrain", simulating the selection of a neutral gear, or depressing of the clutch. In addition, a vehicle simulation system may change its behavior from a normal moving vehicle sound simulation in at least one of two ways:

the simulation may mix audio recordings taken from the target vehicle in neutral. These "unloaded" engine recordings have a different timbre from the driving "loaded" engine sounds; and the simulation may use a different mathematical function which more closely simulates the unloaded engine responding to the driver revving the engine for determining audio parameters such as the loudness of the audio signal to be reproduced by the audio exciter 100.

As shown in FIG. 65, receiver 1312, may output a Throttle signal 1314 on Channel 2, and a "Clutch" signal 1316 on Channel 3. The Throttle signal 1314 and the Clutch signal 1316 may be conveyed to the On-Board Audio (OBA) module 1302 via any suitable electrical conveyance. In an embodiment, the Throttle signal 1314 may be provided to a Vehicle Simulation Module 1350 and to a switching element 1362 within the OBA module 1302. The Vehicle Simulation Module 1350 may be configured to generate engine sounds and other motor vehicle sounds in dependence upon the magnitude and direction of the Throttle signal 1314, which may be understood to range from positive values representing magnitude in one direction, such as forward, to negative values representing magnitude in an opposite direction, such as reverse. It may be understood that a zero magnitude in the Throttle signal 1314 represents an idle condition analogous to an engine idling. The engine sounds and other motor vehicle sounds may be generated within the Vehicle Simulation Module 1350, or may be pre-recorded engine sounds and other motor vehicle sounds in different states of operation such as idling, revving in neutral, accelerating, traveling at a given speed, decelerating, and the like stored within the Vehicle Simulation Module 1350. The engine sounds may be amplified and thereafter reproduced by audio exciter 100 (FIG. 64). The Clutch signal 1316 may be provided to a Motor Bypass Module 1360, and may be understood to range from a first value corresponding to a clutch being engaged, to a second value corresponding to a clutch being disengaged. For example, the Clutch signal 1316 may be controlled by a two-position switch 2002 (FIG. 16) on an R/C remote controller 2000 (FIG. 65), whereas the Throttle signal is typically controlled by a trigger movable in forward and reverse directions and capable of producing a wider range of values. As shown in FIG. 65, the Clutch signal 1316 is at the first value corresponding to a clutch being engaged, and the Motor Bypass Module 1360 controls switching element 1362 to apply the original Throttle signal 1314 as throttle signal 1318, which is conveyed to the Electronic Speed Control (ESC) module 1320.

As shown in FIG. 66, the Clutch signal 1316 is at the second value corresponding to a clutch being disengaged. The Motor Bypass Module 1360 may control switching element 1362 to disconnect the original Throttle signal 1314 from the ESC module 1320 and instead may apply a substitute neutral signal 1364 as throttle signal 1318 which may be conveyed to the Electronic Speed Control (ESC) module 1320. The substitute neutral signal 1364 may command the ESC module 1320 to sit and remain idle. A command to remain idle may be the same exact signal to the ESC module 1320 that is sent when the throttle trigger is at neutral and the Throttle signal 1314 is at zero magnitude, and when the Channel 3 Clutch switch is in a Position A and generating the first value corresponding to a clutch being engaged. However, when the Channel 3 Clutch switch is in a Position B and generating the second value corresponding to a clutch being disengaged, the Motor Bypass Module 1360 may not provide a signal to the ESC commanding that braking or power be applied to the motor. If the model vehicle is rolling in this situation, it will coast; eventually slowing to a stop due to friction, rolling resistance and/or objects in the path of the vehicle. In the meantime, the Vehicle Simulation Module 1350 may generate engine sounds in dependence upon a magnitude and direction of the throttle signal.

Dynamic Fall Off Sounds

Powerful full-sized engines have a range of dynamic sounds which can be heard when throttling down, or changing from one throttle level to another, lower throttle level. These dynamic sounds (such as popping, gurgling, backfire, etc.) may not be easily generated by the Vehicle Simulation system 1350 (FIGS. 65-66). In these cases, the accuracy of the simulation may be enhanced by including playback of actual recordings of a corresponding full-sized vehicle when throttle is reduced. This process may utilize recordings of the full-sized vehicle in which the vehicle begins at a target RPM and throttle is reduced causing the engine to drop the RPM level at a given rate. These "Ramp Clips" may be recorded at different rates.

Turning now to FIG. 67, the Vehicle Simulation System 1350 may have an RPM Estimator 1352 responsive to the Throttle signal 1314. An output signal 1353 representing the RPM estimate may be provided to an Engine Load Estimator 1354, to a Recording Selector 1356, and to an Effect Selector 1358. A mixer 1360 may combine signals from the Engine Load Estimator 1354, the Recording Selector 1356, and the Effect Selector 1358. An output signal 1326 may be provided at audio output 1362 and amplified to drive the audio exciter 100.

Figure 68:
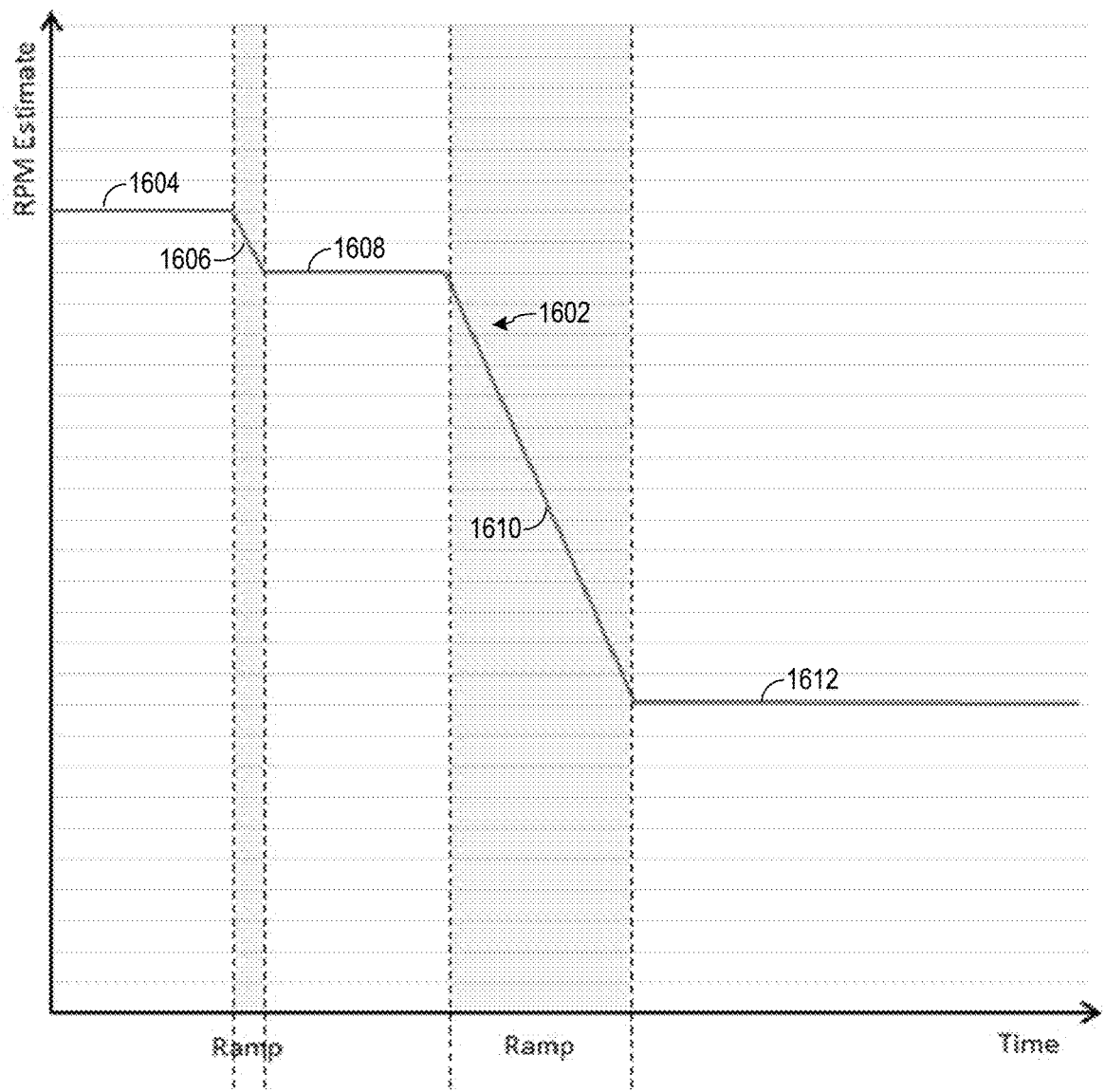
FIG. 68 is graph illustrating an RPM Estimate over time.

In a Recording Selector 1356 process, an RPM estimate 1353 may be used to determine whether the vehicle is experiencing engine deceleration, or dropping from one RPM level to a lower RPM level, as illustrated graphically in FIG. 68. The Recording Selector 1356 may estimate the rate at which engine deceleration may be occurring. As shown in FIG. 68, curve 1602 represents a typical RPM estimate over time, in which the RPM estimate begins at a certain rate 1604, experiences a first period of deceleration 1606, separated by a period of constant RPM estimate 1608, experiences a second period of deceleration 1610, and ends at a lower RPM estimate 1612 than the beginning RPM estimate 1604. Engine deceleration may be detected from descending portions 1606 and 1610 of curve 1602 representing RPM estimate over time. An estimate of the rate of engine deceleration for each descending portion of the curve 1602 may be used to select a Ramp Clip recording which most closely matches the RPM reduction rate in each instance.

The Ramp Clip recordings may then be passed into a mixer 1360 to overlay on top of the audio output of the Vehicle Simulation Module 1350 to provide realistic fall off sounds to the vehicle simulation. Regarding the overlay, a sound simulation algorithm may generate its own engine fall off sound in response to the falling RPM's. This may be done by mixing the "loaded" and "unloaded" engine recordings at each RPM level being passed through as the engine decelerates.

On top of this, the mixer 1360 may overlay an actual recording of the engine decelerating. The volume of the actual recording (v) may be larger than the volume of the simulation playback (MAX VOLUME—v), giving more preference to the actual recording of the engine decelerating.

When selecting the actual recording, there may be several recordings to choose from for each rate. The actual, full-sized engines never sound exactly the same each time, therefore, several Ramp Clips may be recorded at each rate and then randomly selected to add to the realism of the simulation.

The Vehicle Simulation System 1350, using audio recordings from an actual, full-sized vehicle, may match the behavior of the actual full-sized vehicle by offering random sound behavior during Dynamic Fall-Off conditions described above, and by providing Neutral Engine Effects as described previously herein, generating or modulating engine sounds in dependence upon a magnitude and direction of the throttle signal.

Simulated Gear Shifting

Most electric-powered vehicles, including R/C model vehicles, use a single-speed transmission. This means there is a fixed drive ratio between the drive motor and the drive wheels. The transmission does not change ratios while the vehicle is accelerating; it does not "shift gears". The speed of the vehicle will be substantially proportional to the speed of the drive motor. Most people are used to hearing their full sized vehicles "shift gears", or change drive ratios, since the majority of internal combustion powered full-sized vehicles have multi-speed transmissions. In order to better emulate the sound of said full-sized vehicles, a simulated gear shifting algorithm may be provided into the Vehicle Simulation Module 1350 logic.

Figure 69:
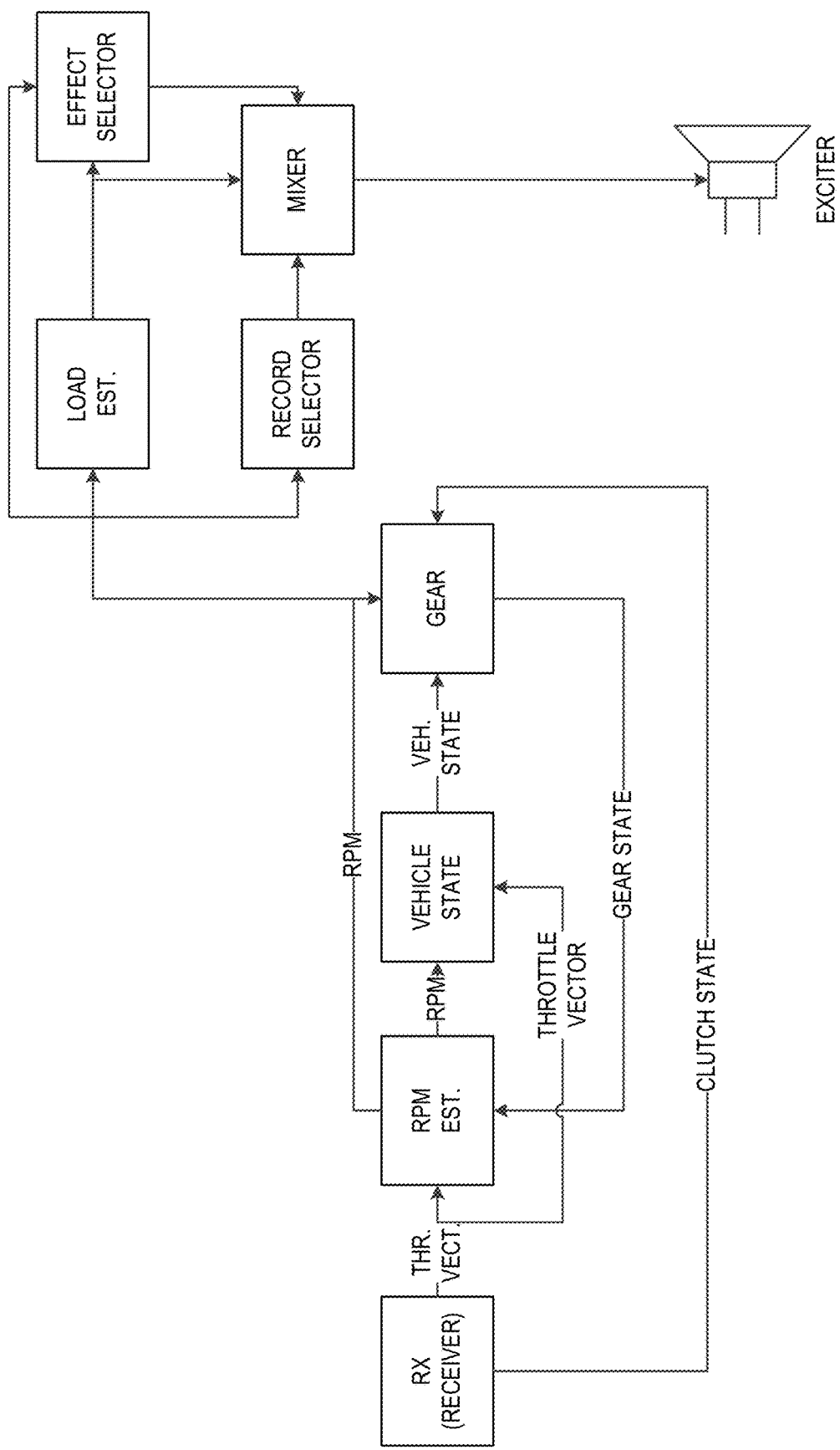
FIG. 69 is a block diagram illustrating the operation of a simulated shifting system.

Referring to FIGS. 67 and 69, systems for simulating "gear shifting" are shown. In an embodiment, the Vehicle Simulation Module 1350 may use an open-loop estimator to determine the RPM Estimate based on the User Inputs, such as throttle direction, throttle magnitude, clutch state, and the like. Additionally the Vehicle Simulation Module 1350 may have a set of observers which use the RPM estimate and User Inputs to determine other vehicle properties like the Vehicle State and Gear State, for example. Audio output 1326 may be modulated by Vehicle Simulation Module 1350 in dependence upon the Vehicle State and the Gear State.

The Vehicle State may be one or more of the following: Idle, Neutral, Driving Forward, Driving Backwards, Braking, Startup, Shutoff, or the like. The Gear State may be one or more of the following: First Gear, Second Gear, Third Gear, Neutral, Reverse, or the like.

The vehicle observer may use the RPM estimate and throttle to determine the Vehicle State. The gear observer may use the output of the vehicle observer (the Vehicle State) and the RPM estimate to determine the gear behavior and the Gear State. For example, if the Vehicle State is observed to be "Driving Backwards," the vehicle may be implemented with logic that may assume the Gear State is Reverse. Similarly, logic may be implemented to assume that the Gear State is Neutral when the vehicle observer determines the Vehicle State is Idle or Neutral.

Logic may further be implemented to assume the vehicle to be in First Gear when transitioning to forward motion from a stop, or when transitioning from backward motion to forward motion. Logic assuming the First Gear state may also be implemented during times when the vehicle is moving forward and the RPM Estimate is below a predetermined value, say 8000 RPM, for example.

Figure 70:
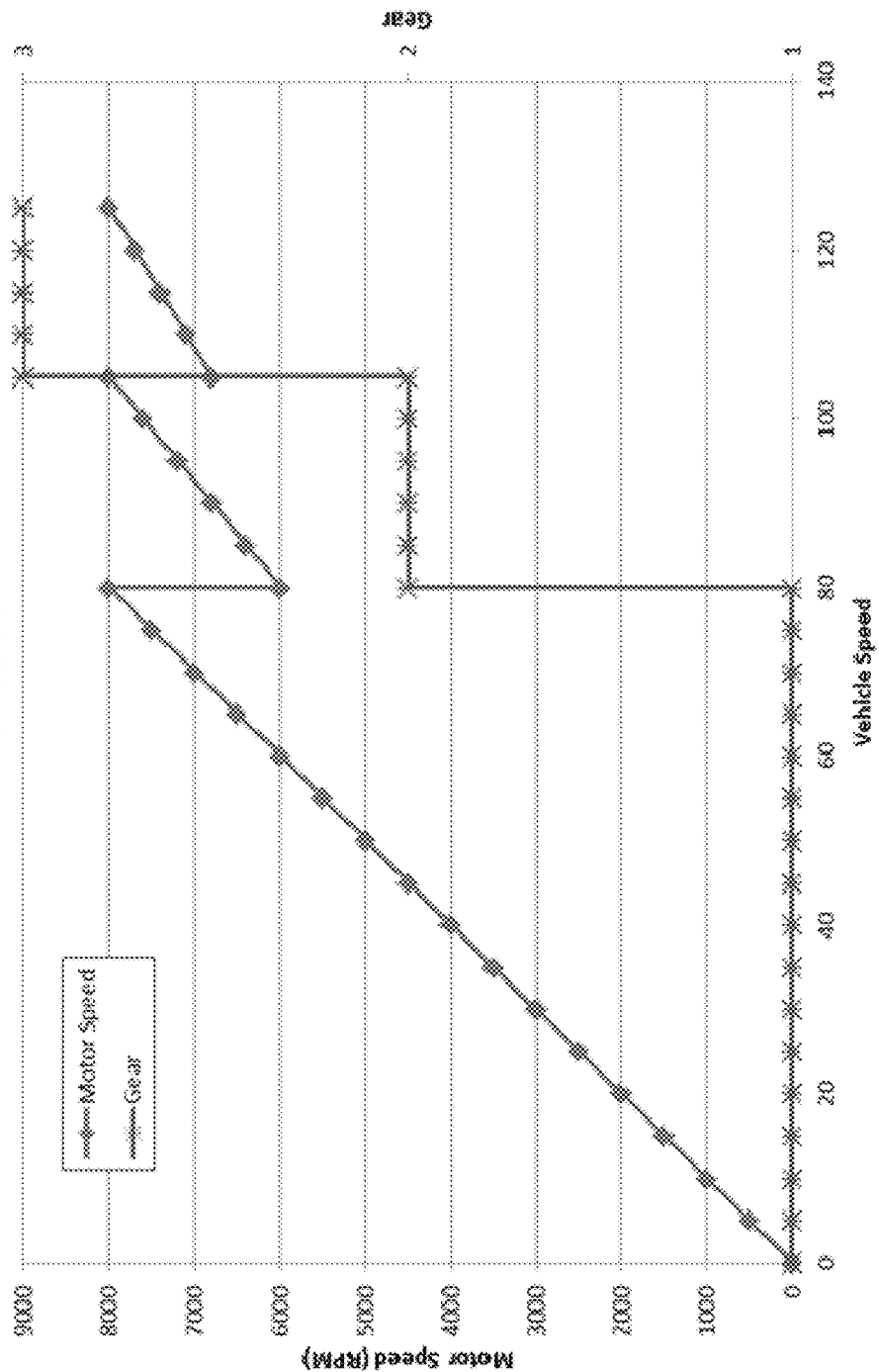
FIG. 70 is a graph illustrating engine RPM, vehicle speed and the three fixed transmission drive ratios (the "gears") used in the simulated shifting system.

As shown in FIG. 70, logic may be implemented assuming the onset of the Second Gear state upon the RPM Estimate exceeding the predetermined threshold value defining the upper limit of the First Gear state (8000 RPM, for example) upon the expiration of a predetermined amount of time (200 ms, for example).

Upon transitioning the Gear State from First Gear to Second Gear, the RPM Estimate may reduce the RPM estimate value. For example, if the transition from First Gear to Second Gear state is triggered upon the RPM estimate exceeding 8000 RPM, then the RPM may be reduced to 6500 RPM during the transition to Second Gear. The amount of RPM drop may be set at a predefined value that creates a "drop off" sound accurately emulating that of an actual gear shift in a multi-gear vehicle. Over time, the RPM may increase while the Gear State remains in Second Gear. Engine sounds corresponding to increasing RPM may be produced during this time.

The Gear State may remain in Second Gear until the RPM Estimate again exceeds a predefined threshold value for a predefined amount of time with the vehicle moving forward, or accelerating, while in Second Gear. At the shift point into Third Gear, the RPM Estimate may reduce again, to a lower RPM, in a manner similar to the RPM drop during transition from First Gear to Second Gear. Over time, the RPM may increase while the Gear State remains in Third Gear. Engine sounds corresponding to increasing RPM may be produced during this time. Shifting from Third Gear down to Second Gear may occur when the RPM Estimate drops below a threshold value, say 5600 RPM, for example. Shifting from Second Gear to First Gear may occur when the RPM estimate drops to an extremely low value, near the idle RPM of the vehicle. For each Gear State, the logic implemented in Vehicle Simulation Module 1350 may modulate engine sounds in dependence upon RPM and the Gear State.

For each Gear State—Neutral, First Gear, Second Gear, Third Gear, and Reverse—a unique RPM Estimate formula may be used to emulate unique characteristics of each Gear State. For example, the RPM Estimate may increase most quickly in First Gear, less quickly in Second Gear, and least quickly in Third Gear. The formula may be a linear or non-linear equation correlating an estimated RPM value to time elapsed, throttle state, or the like. In an embodiment, the RPM value may be derived from a series of asymptotic curves correlating RPM to elapsed time during which the vehicle is moving, or accelerating.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A control system for a model vehicle, comprising:
   a control signal receiver, wherein different receiver control signals are recognized by the receiver on different receiver control channels;
   an audio module for energizing an audio exciter, the audio module coupled to the receiver, wherein the audio module has at least first and second audio control channel inputs for receiving audio control signals from the receiver and at least one output for providing an audio control signal;
   a first receiver control channel recognized by the receiver as a throttle signal and coupled to the first audio control channel input to the audio module;
   a second receiver control channel recognized by the receiver as a clutch signal and coupled to the second audio control channel input to the audio module;
   an electronic speed control (ESC) module for energizing an electric drive motor, the electronic speed control module coupled to the at least one output of the audio module for receiving a control signal; and
   a user interface coupled to the audio module for controlling operation of the audio module.

2. The control system for a model vehicle of claim 1, wherein the audio module generates audio signals comprising sounds simulating vehicle operation for reproduction by the audio exciter.

3. The control system for a model vehicle of claim 1, wherein the audio module generates control signals for the electronic speed control.

4. The control system for a model vehicle of claim 1, wherein the audio module generates signals simulating engine sounds in response to the throttle signal.

5. The control system for a model vehicle of claim 4, wherein the engine sounds comprise one or more of idling sounds, revving neutral sounds, accelerating sounds, travelling at a given speed sounds, and decelerating sounds.

6. The control system for a model vehicle of claim 1, wherein the audio module generates a substitute neutral control signal for conveyance to the electronic speed control in response to an on-or-off state of the clutch signal.

7. The control system for a model vehicle of claim 6, wherein the substitute neutral control signal comprises a zero-magnitude signal applied when the throttle signal is zero.

8. The control system for a model vehicle of claim 6, wherein the substitute neutral control signal induces an idle condition in the electronic speed control, wherein no more than idle power is applied to the drive motor.

9. The control system for a model vehicle of claim 1, wherein the audio exciter is configured to vibrate a body of the model vehicle when the audio exciter is energized, thereby producing audible sounds.

10. The control system for a model vehicle of claim 5, wherein the engine sounds are recordings of a full-sized vehicle.

11. The control system for a model vehicle of claim 10, wherein the recordings are recordings of a full-sized vehicle in which the vehicle begins at a first level of revolutions per minute and throttle is reduced causing the engine to decrease the level of revolutions per minute at a given rate.

12. The control system for a model vehicle of claim 11, wherein the recordings may be recorded at different rates.

13. The control system for a model vehicle of claim 1, wherein the audio module comprises a vehicle simulation system and a motor bypass system.

14. The control system for a model vehicle of claim 13, wherein the vehicle simulation system comprises:
   a revolutions-per-minute estimator, the revolutions-per-minute estimator determining an estimated level of revolution per minute in response to the throttle signal;
   an engine load estimator, the engine load estimator determining an estimated level of engine load in response to the estimated level of revolution per minute;
   a recording selector, the recording selector determining an estimated a rate of engine deceleration in response to the estimated level of revolution per minute, and selecting an engine sound in response to the estimated rate of engine deceleration;
   an effect selector, the effect selector generating dynamic sounds comprising one or more of popping sounds, gurgling sounds, and backfire sounds in response to the estimated level of revolution per minute and the estimated level of engine load; and
   an audio mixer coupled to the engine load estimator, the recording selector, and the effect selector, the audio mixer combining the engine sounds generated by each of the engine load estimator, the recording selector, and the effect selector; and
   an audio output coupled to a combined output of the audio mixer.

15. The control system for a model vehicle of claim 1, further comprising:
   a vehicle simulation system, wherein the vehicle simulation system comprises:
   a revolutions-per-minute estimator, the revolutions-per-minute estimator determining an estimated level of revolution per minute in response to the throttle signal;
   an engine load estimator, the engine load estimator determining an estimated level of engine load in response to the estimated level of revolution per minute;
   a recording selector, the recording selector determining a rate of engine deceleration in response to the estimated level of revolution per minute, and selecting an engine sound in response to the estimated rate of engine deceleration;
   an effect selector, the effect selector generating dynamic sounds comprising one or more of popping sounds, gurgling sounds, and backfire sounds in response to the estimated level of revolutions per minute and the estimated level of engine load;

an audio mixer coupled to the engine load estimator, the recording selector, and the effect selector, the audio mixer combining the engine sounds generated by each of the engine load estimator, the recording selector, and the effect selector; and an audio output coupled to a combined output of the audio mixer.

16. The control system for a model vehicle of claim 15, wherein the vehicle simulation system further comprises one or more observers, the observers determining an operating state of the model vehicle.

17. The control system for a model vehicle of claim 16, wherein a vehicle observer determines a vehicle state comprising at least one of Idle, Neutral, Driving Forward, Driving Backwards, Braking, Startup, and Shutoff.

18. The control system for a model vehicle of claim 16, wherein a gear observer determines a gear state comprising at least one of Neutral, First Gear, Second Gear, Third Gear, and Reverse.

19. The control system for a model vehicle of claim 18, wherein the signals simulating engine sounds are modulated in response to the gear state.

20. The control system for a model vehicle of claim 16, wherein the signals simulating engine sounds are modulated in response to the vehicle state.

21. The control system for a model vehicle of claim 16, wherein logic is implemented to estimate when a shift in gear state should occur in response to the vehicle state, the gear state, the estimated level of revolutions per minute, and wherein the logic modulates audio signals simulating to affect the engine sound in response to a reduced estimated level of revolutions per minute following a shift in gear state.

22. The control system for a model vehicle of claim 21, wherein the logic modulates audio signals simulating to affect the engine sound in response to an increased estimated level of revolutions per minute following a shift in gear state.

\* \* \* \* \*